(12) United States Patent
Yamada

(10) Patent No.: US 10,966,105 B2
(45) Date of Patent: Mar. 30, 2021

(54) SYSTEMS AND METHODS FOR RE-ESTABLISHING A CONNECTION

(71) Applicant: Sharp Kabushiki Kaisha, Sakai (JP)

(72) Inventor: Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/649,611

(22) Filed: Jul. 13, 2017

(65) Prior Publication Data

US 2017/0311185 A1 Oct. 26, 2017

Related U.S. Application Data

(62) Division of application No. 15/079,645, filed on Mar. 24, 2016, now Pat. No. 9,713,022, which is a division of application No. 13/890,987, filed on May 9, 2013, now Pat. No. 9,332,473.

(51) Int. Cl.
    | | |
    |---|---|
    | *H04W 24/04* | (2009.01) |
    | *H04W 36/28* | (2009.01) |
    | *H04W 76/15* | (2018.01) |
    | *H04W 36/00* | (2009.01) |

(52) U.S. Cl.
    CPC ....... *H04W 24/04* (2013.01); *H04W 36/0079* (2018.08); *H04W 36/28* (2013.01); *H04W 76/15* (2018.02); *H04W 36/0055* (2013.01); *H04W 36/0069* (2018.08)

(58) Field of Classification Search
    CPC .. H04W 24/04; H04W 76/15; H04W 36/0055
    USPC ............ 455/423, 450, 422.1, 418, 421
    See application file for complete search history.

(56) References Cited

U.S. PATENT DOCUMENTS

| | | | |
|---|---|---|---|
| 9,326,211 B2* | 4/2016 | Kaur ................. | H04W 36/0072 |
| 9,332,473 B2* | 5/2016 | Yamada ............... | H04W 24/04 |
| 9,357,460 B2* | 5/2016 | Yamada ............. | H04W 36/165 |
| 9,713,022 B2* | 7/2017 | Yamada ............... | H04W 24/04 |
| 2010/0260146 A1* | 10/2010 | Lu ........................ | H04L 12/4633 370/331 |
| 2011/0028144 A1 | 2/2011 | Catovic et al. | |
| 2011/0299465 A1 | 12/2011 | Iwamura et al. | |
| 2012/0147755 A1* | 6/2012 | Chen ...................... | H04L 5/001 370/242 |

(Continued)

FOREIGN PATENT DOCUMENTS

WO 2012121757 9/2012

OTHER PUBLICATIONS

3GPP TS 36.300 V11.5.0, "Evolved Universal Terrestrial Radio Access (E-UTRA) and Evolved Universal Terrestrial Radio Access Network (E-UTRAN); Overall Description; Stage 2 (Release 11)," Mar. 2013.

3GPP TR 36.932 V12.1.0,"Scenarios and Requirements for Small Cell Enhancements for E-UTRA and E-UTRAN (Release 12)," Mar. 2013.

(Continued)

*Primary Examiner* — Nghi H Ly
(74) *Attorney, Agent, or Firm* — Austin Rapp

(57) ABSTRACT

A method for re-establishing a connection by a user equipment (UE) is described. The method includes establishing a first connection between the UE and an Evolved Universal Terrestrial Radio Access Network (E-UTRAN). The method also includes establishing a second connection between the UE and the E-UTRAN. The method also includes informing the E-UTRAN of a failure of the second connection when a failure of the second connection is detected.

4 Claims, 21 Drawing Sheets

(56) References Cited

U.S. PATENT DOCUMENTS

| | | | |
|---|---|---|---|
| 2012/0163192 A1* | 6/2012 | Bae | H04W 76/18 370/242 |
| 2012/0172043 A1 | 7/2012 | Chin et al. | |
| 2013/0115959 A1 | 5/2013 | Amirijoo et al. | |
| 2013/0225168 A1* | 8/2013 | Singh | H04W 8/005 455/435.1 |
| 2013/0294307 A1 | 11/2013 | Johansson et al. | |
| 2014/0024374 A1* | 1/2014 | Bergman | H04W 36/0083 455/436 |
| 2014/0087729 A1 | 3/2014 | Olofsson et al. | |
| 2014/0099941 A1 | 4/2014 | Ji et al. | |
| 2015/0017976 A1* | 1/2015 | Liu | H04W 76/19 455/423 |

OTHER PUBLICATIONS

NTT DcCoMo, Inc, "New Study Item Description: Small Cell enhancements for E-UTRA and E-UTRAN Higher-layer Aspects," 3GPP TSG-RAN Meeting #58, RP-122033, Dec. 2012.

Nokia Siemens Networks, Nokia Corporation, "Re-Establishment Enhancements for HetNet," 3GPP TSG-RAN WG2 Meeting 81bis, R2-131423, Apr. 2013.

Qualcomm Incorporated, "RLF Recovery Enhancements," 3GPP TSG-RAN WG2 Meeting 81bis, R2-130933 Apr. 2013.

CATT, CATR, "RLM Considerations for Dual Connectivity," 3GPP TSG RAN WG2 Meeting 81bis, R2-130982 Apr. 2013.

Qualcomm Incorporated, NTT DoCoMo, Inc., "Metrics and Scenarios for Small Cell Study of RRM Structure and Mobility Enhancements," 3GPP TSG-RAN2 #81, R2-130597, Feb. 2013.

Office Action issued for U.S. Appl. No. 13/890,987 dated Oct. 1, 2014.

Office Action issued for U.S. Appl. No. 13/890,987 dated Mar. 6, 2015.

Notice of Allowance issued for U.S. Appl. No. 13/890,987 dated Jan. 7, 2016.

Notice of Allowance issued for U.S. Appl. No. 15/079,645 dated Mar. 23, 2017.

NTT DoCoMo, Inc., "Necessity of C-Plane Architecture Enhancements for Dual Connectivity," 3GPP TSG-RAN2 81, R2-130488, Feb. 2013.

* cited by examiner

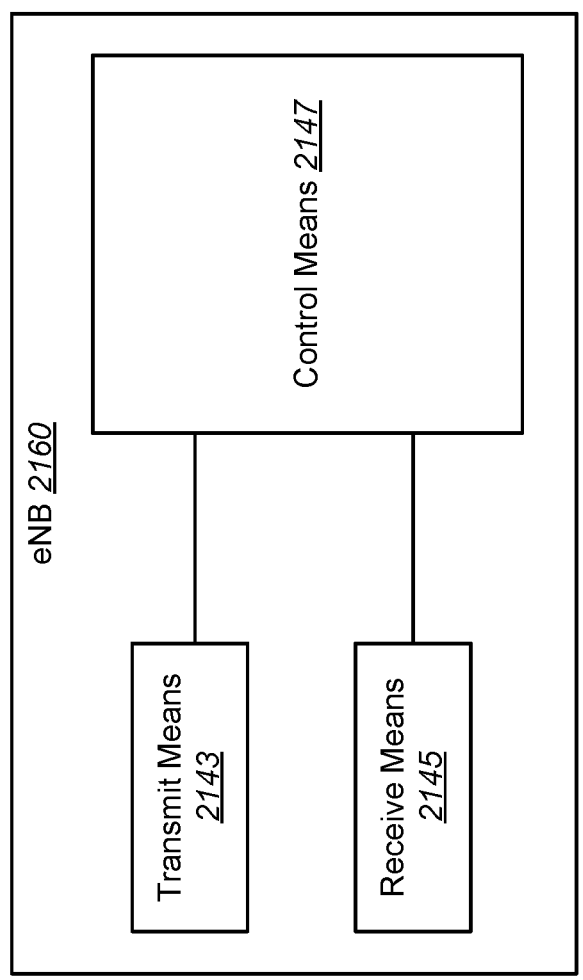

SYSTEMS AND METHODS FOR RE-ESTABLISHING A CONNECTION

CROSS-REFERENCE TO RELATED APPLICATIONS

This application is a divisional of U.S. patent application Ser. No. 15/079,645, entitled "SYSTEMS AND METHODS FOR RE-ESTABLISHING A CONNECTION," filed on Mar. 24, 2016, which is a divisional of U.S. patent application Ser. No. 13/890,987, entitled "SYSTEMS AND METHODS FOR RE-ESTABLISHING A CONNECTION," filed on May 9, 2013, both of which are incorporated by reference herein, in their entireties.

TECHNICAL FIELD

The present disclosure relates generally to communication systems. More specifically, the present disclosure relates to systems and methods for re-establishing a connection.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using a communication structure. However, the communication structure used may offer limited flexibility and efficiency. As illustrated by this discussion, systems and methods that improve communication flexibility and efficiency may be beneficial.

BRIEF DESCRIPTION OF THE DRAWINGS

FIG. 21 is a block diagram illustrating one configuration of an eNB in which systems and methods for re-establishing a connection may be implemented.

DETAILED DESCRIPTION

Figure 1:
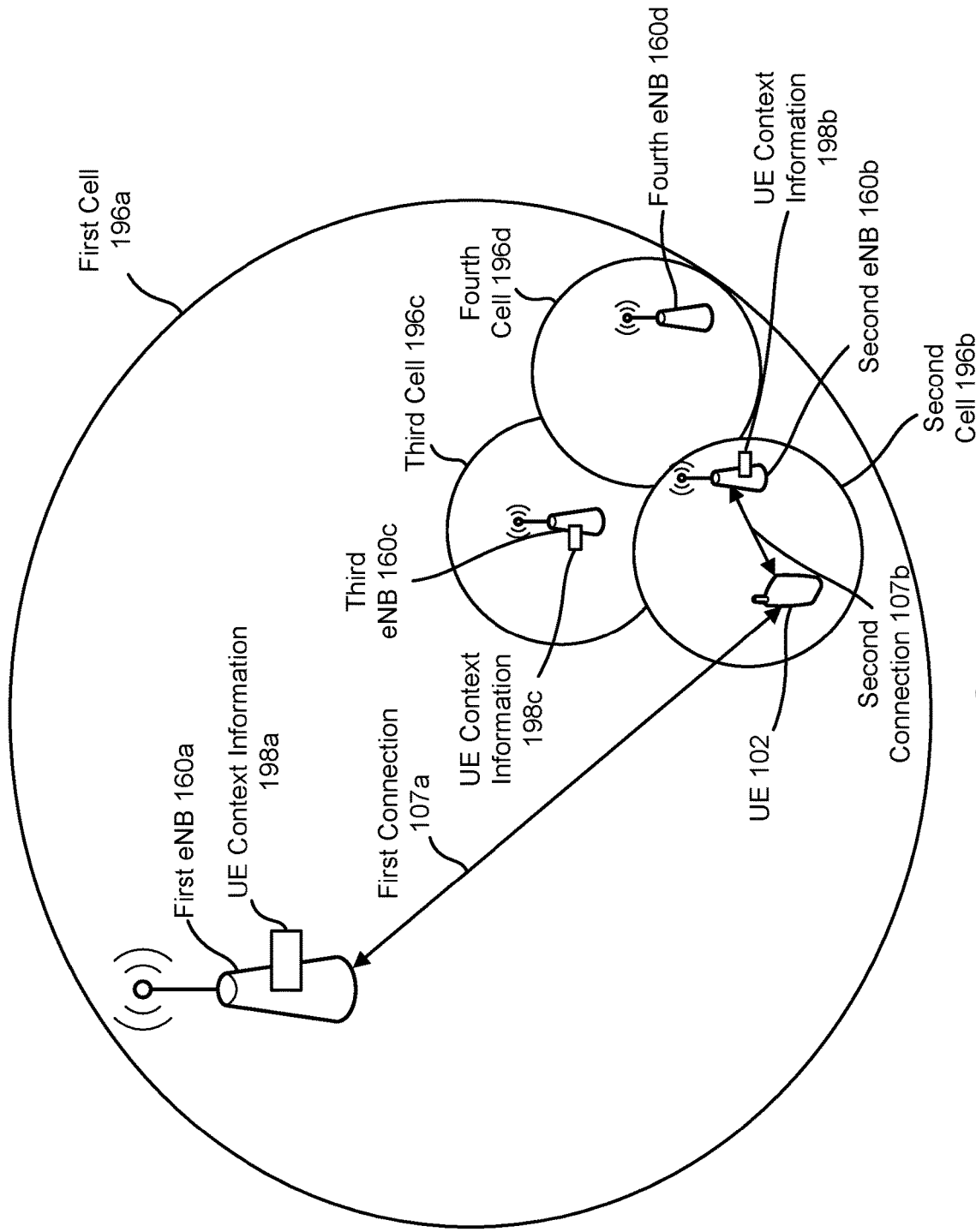
FIG. 1 is a block diagram illustrating dual connectivity between a user equipment (UE) and multiple evolved Node Bs (eNBs)

A method for re-establishing a connection by a user equipment is described. The method includes establishing a first connection between the UE and an E-UTRAN. The method also includes establishing a second connection between the UE and the E-UTRAN. The method further includes informing the E-UTRAN of a failure of the second connection when a failure of the second connection is detected.

The method may include determining whether to use the first connection or the second connection to inform the E-UTRAN of the failure of the second connection. The method may include informing a suitable cell about the failure of the second connection if the suitable cell is detected. The method may also include informing a cell of the first connection about the failure of the second connection if the suitable cell is not detected. The method may include selecting the suitable cell for a re-established second connection from a prepared re-establishment candidate cells list. The method may include releasing the second connection if the suitable cell is not detected.

The failure of the second connection may be at least one of an addition of connection failure, a handover failure, a radio link failure, an Evolved Universal Terrestrial Access (E-UTRA) mobility failure, an integrity check failure and a reconfiguration failure. The method may include indicating a cause of the failure.

A method for re-establishing a connection by an evolved Node B (eNB) is described. The method includes receiving information about a failure of a second connection between a UE and an E-UTRAN. The method also includes determining whether UE context information is stored on the eNB. The method also includes re-establishing the second connection when UE context information is stored on the eNB. The method further includes informing another eNB of the E-UTRAN about the re-established second connection.

The UE may have a first connection with the E-UTRAN. The method may include providing a prepared re-establishment candidate cells list for the re-established second connection. The prepared re-establishment candidate cells may include UE context information for the re-established second connection.

The method may include preparing UE context information for the re-established second connection. The failure of the second connection is at least one of an addition of connection failure, a handover failure, a radio link failure, an E-UTRA mobility failure, an integrity check failure and a reconfiguration failure.

A UE for re-establishing a connection is described. The UE includes a processor. The UE also includes memory in electronic communication with the processor. Instructions stored in the memory are executable to establish a first connection between the UE and an E-UTRAN. The instructions are also executable to establish a second connection between the UE and the E-UTRAN. The instructions are further executable to inform the E-UTRAN of a failure of the second connection when a failure of the second connection is detected.

An eNB for re-establishing a connection is described. The eNB includes a processor. The eNB also includes memory stored in electronic communication with the processor. Instructions stored in the memory are executable to receive information about a failure of a second connection between a UE and an E-UTRAN. The instructions are further executable to determine whether UE context information is available to the eNB. The instructions are also executable to re-establish the second connection when UE context information is available to the eNB. The instructions are further executable to inform another eNB of the E-UTRAN about the re-established second connection.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., a public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. In 3GPP, the term "cell" may refer to a coverage area of an eNB and/or an eNB serving this coverage area, depending on the context in which the term is used. "Configured cells" are those cells of which the UE is aware and is allowed by an eNB to transmit or receive information. "Configured cell(s)" may be serving cell(s). The UE may receive system information and perform the required measurements on all configured cells. "Configured cell(s)" may consist of a primary cell and no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

As used herein, the term "connection" may refer to a communication link between a UE and an E-UTRAN. As used herein, the terms "radio connection," "connection," "radio interface" and "interface" may be used interchangeably.

The systems and methods described herein may enhance carrier aggregation. In carrier aggregation, a single eNB may be assumed to provide multiple serving cells for a UE. Even in scenarios where two or more cells may be aggregated (e.g., a macro cell aggregated with remote radio head (RRH) cells), the cells may be controlled (e.g., scheduled) by a single eNB. However, in a small cell deployment scenario, each node (e.g., eNB, RRH, etc.) may have its own independent scheduler. To utilize the radio resources of both nodes efficiently, a UE may connect to two or more nodes that have different schedulers.

In one configuration, for a UE to connect to two nodes (e.g., eNBs) that have different schedulers, multi-connectivity between the UE and the E-UTRAN may be utilized. For example, in addition to Rel-11 operation, a UE operating according to the Rel-12 standard may be configured with multi-connectivity (which may be referred to as dual connectivity, inter-eNB carrier aggregation, multi-flow, multi-cell cluster, multi-Uu, etc.). The UE may connect to the E-UTRAN with multiple Uu interfaces, if configured to do so. For instance, the UE may be configured to establish one or more additional radio interfaces (e.g., radio connections) by using one radio interface (e.g., radio connection). Hereafter, one node may be called a primary eNB (PeNB) and another node may be called a secondary eNB (SeNB). A Uu interface (which may be called a primary Uu interface) may be a connection between the UE and the PeNB. A Uux interface (which may be called a secondary Uu interface) may be a connection between the UE and the SeNB.

In some instances, one of the connections with the E-UTRAN may fail. Accordingly, to utilize the radio resources of both connections, the failed connection may be re-established. The systems and methods described herein may allow the UE and the E-UTRAN to re-establish a connection and to continue efficiently utilizing both connections.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating dual connectivity between a UE 102 and multiple eNBs 160a-d. The eNBs 160a-d may be part of an E-UTRAN that provides communication channels to the UE 102. As depicted in FIG. 1, the first eNB 160a may provide a first cell 196a that allows the UE 102 to communicate with the first eNB 160a. Similarly, a second eNB 160b, a third eNB 160c and a fourth eNB 160d may provide a second cell 196b, a third cell 196c and a fourth cell 196d, respectively.

To implement dual connectivity, the UE 102 may establish a first connection 107a with the E-UTRAN via the first eNB 160a, and may establish a second connection 107b with the E-UTRAN via the second eNB 160b. Dual connectivity between the UE 102 and the E-UTRAN may be beneficial as it utilizes radio resources of multiple nodes efficiently.

As mentioned above, in some instances, the second connection 107b may be lost, for example due to an inability of the UE 102 to comply with a reconfiguration request. However, the second connection 107b may be re-established between the UE 102 and the E-UTRAN. The second connection 107b may be re-established with a cell 196 that has access to UE context information 198b-c corresponding to the second connection 107b. A cell 196 that has access to UE context information 198a-c may be referred to as a prepared cell. A cell 196 may have access to UE context information if the eNB that is providing the cell stores the UE context information.

UE context information 198a-c may be information that allows a connection to be established between the UE 102 and the E-UTRAN. The UE context information 198a-c may include radio resource control (RRC) context information such as configuration information, configured cell identifications, security information, etc. The UE context information 198a-c may also include quality of service (QoS) information and UE identities. The UE context information 198a-c may be connection specific. For example, first connection UE context information 198a may allow a first connection 107a to be established between the UE 102 and a first eNB 160a. By comparison, second connection UE context information 198b-c may allow a second connection 107b to be established (or re-established) between the UE 102 and the second eNB 160b or the third eNB 160c. The second connection UE context information 198b-c may or may not be the same as the first connection UE context information 198a. For example, the second connection UE context information 198b-c may be part of the first connection UE context information 198a. In some cases, the second connection UE context information 198b-c may include additional information that may be different than the first connection UE context information 198a.

To establish the first connection 107a and the second connection 107b, the first eNB 160a, the second eNB 160b and the third eNB 160c may store UE context information 198a-c for the UE 102. More specifically, the first eNB 160a may store first connection UE context information 198a and the second eNB 160b and the third eNB 160c may store second connection UE context information 198b-c. Accordingly, the first cell 196a, the second cell 196b and the third cell 196c may be prepared cells for a re-established connection. By comparison, the fourth cell 196d, on account of not having access to UE context information, may not be a prepared cell for a connection.

Figure 2:
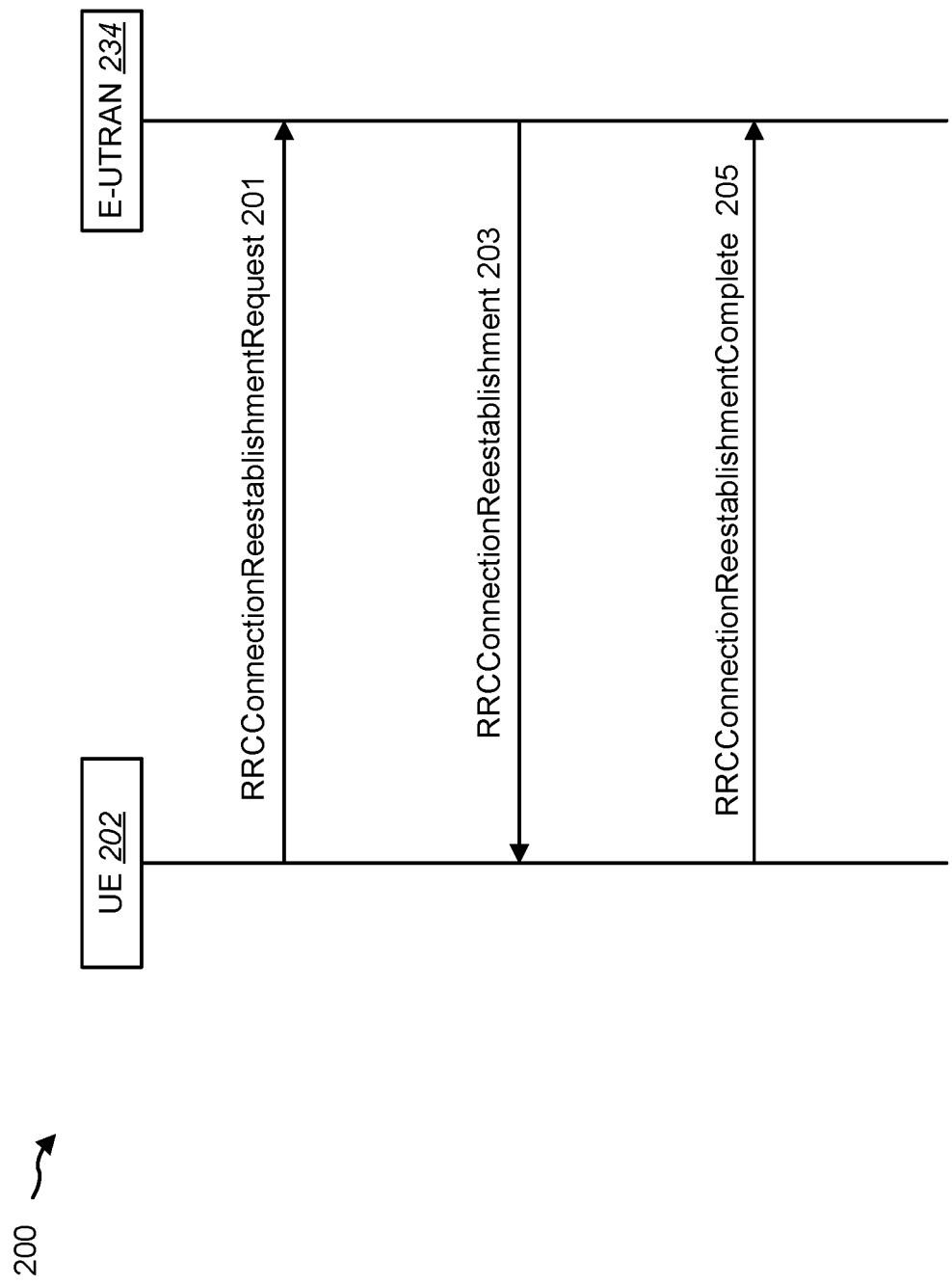
FIG. 2 is a thread diagram illustrating one configuration of a successful connection re-establishment procedure.

FIG. 2 is a thread diagram illustrating one configuration of a successful connection re-establishment procedure 200. The UE 202 may be an example of the UE 102 described in connection with FIG. 1. The procedure 200 may be initiated after the UE 202 detects a connection failure and selects a suitable cell. Selecting a suitable cell may be based on a measured reference signal received power (RSRP) of a cell. More detail concerning failure detection and suitable cell selection will be given below in connection with FIGS. 4-6. Re-establishing a connection may include resuming signal radio bearer (SRB1) operation, reactivating security, and configuring a primary cell (PCell). If the E-UTRAN 234 accepts the re-establishment, SRB1 operation may resume while the operation of other radio bearers (RBs) may remain suspended. The E-UTRAN 234 may reconfigure SRB1 operation, resume data transfer for this radio bearer (RB) and re-activate access stratum (AS) security without changing algorithms. The UE 202 may be configured so that if AS security has not been activated, the UE 202 does not initiate the procedure, but instead moves to an idle state.

To initiate the re-establishment, the UE 202 may send 201 a connection re-establishment request message to the E-UTRAN 234. More specifically, the UE 202 may set the contents of an RRCConnectionReestablishmentRequest message. The connection re-establishment request message may include one or more fields that indicate configuration settings of a desired connection. For example, the connection re-establishment request message may include a cell Radio Network Temporary Identifier (c-RNTI) field, a physical cell identifier field, etc. The connection re-establishment request message may also identify a cause of the failure that triggered the re-establishment. The UE 202 may then submit the connection re-establishment message to at least one lower layer of the UE 202 (e.g., at least one of a packet data convergence protocol (PDCP) layer of the UE 202, a radio link control (RLC) layer of the UE 202, a media access control (MAC) layer of the UE 202 or a physical (PHY) layer of the UE 202) for transmission to the E-UTRAN 234.

After receiving the connection re-establishment request message, the E-UTRAN 234 may send 203 a connection re-establishment message to the UE 202. More specifically, the E-UTRAN 234 may send 203 an RRCConnectionReestablishment message. The connection re-establishment message may acknowledge the receipt of the connection re-establishment request message and may provide the UE 202 with configuration information for a re-established connection. For example, the connection re-establishment message may include radio resource configuration information, integrity protection algorithms, ciphering application algorithms, etc. to be applied by the UE 202 on subsequent transmissions. The E-UTRAN 234 may be configured so that after sending 203 the connection re-establishment message to the UE 202, the E-UTRAN 234 does not send any other messages to the UE 202 until the connection re-establishment complete message has been received.

After receiving the connection re-establishment message, the UE 202 may implement the configuration changes indicated in the connection re-establishment message. The UE 202 may then send 205 a connection re-establishment complete message to the E-UTRAN 234. More specifically, the UE 202 may set the contents of an RRCConnectionReestablishmentComplete message. The UE 202 may then submit the connection re-establishment complete message to at least one lower layer of the UE 202 (e.g., at least one of a PDCP layer, an RLC layer, a MAC layer or a PHY layer) for transmission to the E-UTRAN 234. The connection re-establishment complete message may indicate to the E-UTRAN 234 that the connection re-establishment has been successful (e.g., the UE 202 has applied the configuration changes successfully) and that transmissions between the UE 202 and the E-UTRAN 234 may resume.

Figure 3:
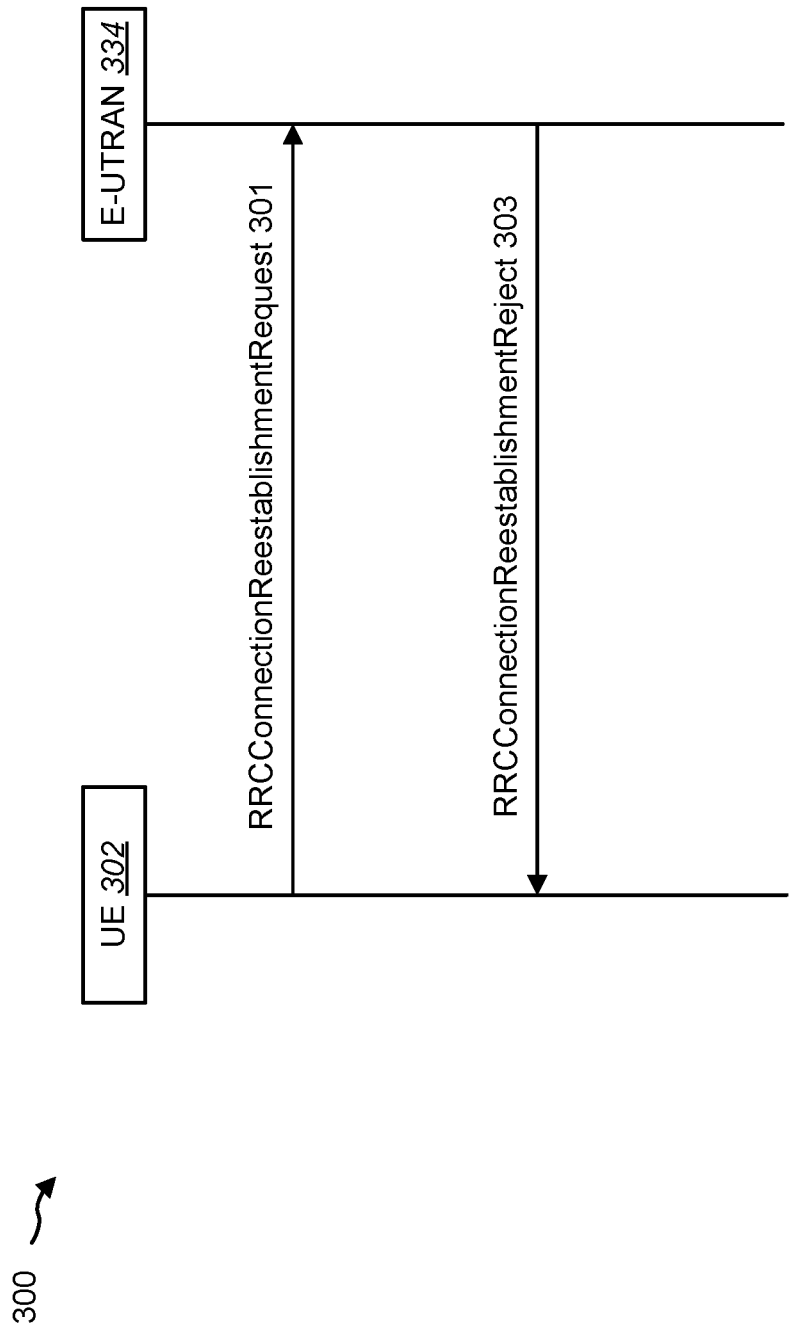
FIG. 3 is a thread diagram illustrating one configuration of a failed connection re-establishment procedure.

FIG. 3 is a thread diagram illustrating one configuration of a failed connection re-establishment procedure 300. The UE 302 and the E-UTRAN 334 may be examples of corresponding elements described in connection with FIGS. 1 and 2. The UE 302 may send 301 a connection re-establishment request message. This may be done as described in connection with FIG. 2.

After receiving the connection re-establishment request message, the E-UTRAN 334 may send 303 a connection re-establishment reject message to the UE 302. More specifically, the E-UTRAN 334 may send 303 an RRCConnectionReestablishmentReject message. The connection re-establishment reject message may indicate to the UE 302 that a re-established connection may not be established. Upon receiving the connection re-establishment reject message, the UE 302 may release the connection. It should be noted that one or more of the steps described in connection with FIGS. 2 and 3 may be implemented in accordance with 3GPP TS 36.331.

Figure 4:
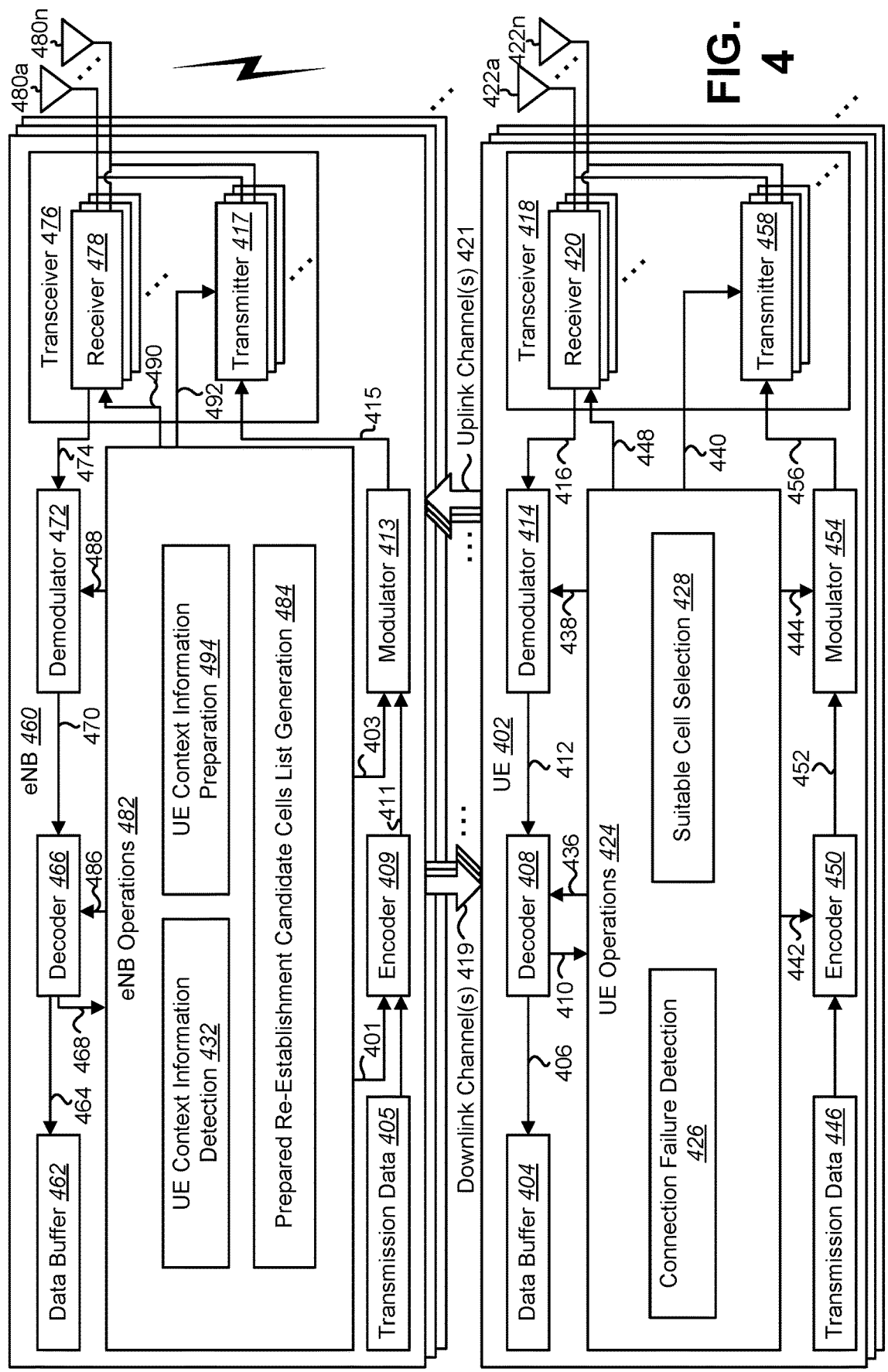
FIG. 4 is a block diagram illustrating one configuration of one or more eNBs and one or more UEs in which systems and methods for re-establishing a connection may be implemented.

FIG. 4 is a block diagram illustrating one configuration of one or more eNBs 460 and one or more UEs 402 in which systems and methods for re-establishing a connection may be implemented. The eNBs 460 and the UEs 402 may be examples of the eNBs 160a-d and the UE 102 described in connection with FIG. 1. The one or more UEs 402 may communicate with one or more eNBs 460 using one or more antennas 422a-n. For example, a UE 402 may transmit electromagnetic signals to the eNB 460 and may receive electromagnetic signals from the eNB 460 using the one or more antennas 422a-n. The eNB 460 may communicate with the UE 402 using one or more antennas 480a-n. It should be noted that one or more of the UEs described herein may be implemented in a single device in some configurations. Additionally or alternatively, one or more of the eNBs 460 described herein may be implemented in a single device in some configurations. In the context of FIG. 4, for instance, a single device may include one or more UEs 402 in accordance with the systems and methods described herein. Additionally or alternatively, one or more eNBs 460 in accordance with the systems and methods described herein may be implemented as a single device or multiple devices.

The UE 402 and the eNB 460 may use one or more channels 419, 421 to communicate with each other. For example, a UE 402 may transmit information or data to the eNB 460 using one or more uplink channels 421. Examples of uplink channels 421 include a physical uplink control channel (PUCCH) and a physical uplink shared channel (PUSCH), etc. The one or more eNBs 460 may also transmit information or data to the one or more UEs 402 using one or more downlink channels 419, for instance. Examples of downlink channels 419 include a PDCCH, a PDSCH, etc. Other kinds of channels may be used.

Each of the one or more UEs 402 may include one or more transceivers 418, one or more demodulators 414, one or more decoders 408, one or more encoders 450, one or more modulators 454, a data buffer 404 and a UE operations module 424. For example, one or more reception and/or transmission paths may be implemented in the UE 402. For convenience, only a single transceiver 418, decoder 408, demodulator 414, encoder 450 and modulator 454 are illustrated in the UE 402, though multiple parallel elements (e.g., transceivers 418, decoders 408, demodulators 414, encoders 450 and modulators 454) may be implemented.

The transceiver 418 may include one or more receivers 420 and one or more transmitters 458. The one or more receivers 420 may receive signals from the eNB 460 using one or more antennas 422a-n. For example, the receiver 420 may receive and downconvert signals to produce one or more received signals 416. The one or more received signals 416 may be provided to a demodulator 414. The one or more transmitters 458 may transmit signals to the eNB 460 using one or more antennas 422a-n. For example, the one or more transmitters 458 may upconvert and transmit one or more modulated signals 456.

The demodulator 414 may demodulate the one or more received signals 416 to produce one or more demodulated signals 412. The one or more demodulated signals 412 may be provided to the decoder 408. The UE 402 may use the decoder 408 to decode signals. The decoder 408 may produce one or more decoded signals 406, 410. For example, a first UE-decoded signal 406 may comprise received payload data, which may be stored in a data buffer 404. A second UE-decoded signal 410 may comprise overhead data and/or control data. For example, the second UE-decoded signal 410 may provide data that may be used by the UE operations module 424 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the eNB operations module 482 may be implemented in hardware, software or a combination of both.

In general, the UE operations module 424 may enable the UE 402 to communicate with the one or more eNBs 460.

The UE operations module 424 may include a connection failure detection module 426 and a suitable cell selection module 428.

The connection failure detection module 426 may detect a failure of a connection between the UE 402 and the E-UTRAN 234. For example, the connection failure detection module 426 may detect a failure of a second connection 107b between the UE 402 and the second eNB 160b that is included in the E-UTRAN 234. After detecting a failure, the UE 402 may initiate a connection re-establishment procedure. The connection failure detection module 426 may detect different types of connection failures. Various examples of failure detection and subsequent initiation of a connection re-establishment procedure are given as follows.

In one example, the connection failure detection module 426 may detect radio link failure. A radio link failure may include the detection of physical layer complications. For example, the UE 402 may receive a certain amount of consecutive "out-of-sync" indications from the PHY layer. The "out-of-sync" indications may pertain to communications between the UE 402 and a primary cell (PCell). When physical layer complications are detected, the UE 402 may start a timer. Upon expiration of the timer, the UE 402 may determine that radio link failure has been detected. In another example, the UE 402 may detect radio link failure upon a random access problem indication from the MAC layer. In yet another example, the UE 402 may detect radio link failure upon indication from the RLC layer that the maximum number of retransmissions has been reached. In some cases, if access stratum (AS) security has not been activated and the UE 402 has detected failure, the UE 402 may perform certain actions upon leaving a radio resource control (RRC) connected state.

In another example, the connection failure detection module 426 may detect a handover failure. For example, the UE 402 may receive a connection reconfiguration message from the eNB 460 that includes a handover command. If the UE 402 is able to comply with the connection reconfiguration message, the UE 402 may start a timer. The UE 402 may then begin synchronizing with a downlink of a target PCell and may generate a connection reconfiguration complete message to be submitted to lower layers of transmission (e.g., a MAC layer). The connection reconfiguration complete message may direct the MAC layer to initiate a random access procedure. If the MAC layer successfully completes the random access procedure, the UE 402 may stop the timer. If the MAC layer does not complete the random access procedure before the timer expires, the UE 402 may determine that a handover failure has been detected.

Another example of a connection failure may be an Evolved Universal Terrestrial Radio Access (E-UTRA) mobility failure. For example, a UE 402 may attempt to move from a connected state in an E-UTRA to a cell using another radio access technology (RAT). If the mobility from E-UTRA fails, the UE 402 may detect connection failure. Examples of other RATs may include Global System for Mobile Communications (GSM) Enhanced Data Rates for GSM Evolution (EDGE) Radio Access Network (GERAN), Universal Mobile Telecommunications System (UMTS) Terrestrial Radio Access (UTRA) and Code Division Multiple Access 2000 (CDMA2000).

In another example, the connection failure may be an integrity check failure. For example, the RRC layer of the UE 402 may receive an integrity check failure indication from a lower layer of the UE 402. Accordingly, the UE 402 may determine that a connection has failed.

In yet another example, the connection failure may be a reconfiguration failure. For example, if the UE 402 is unable to comply with a connection reconfiguration message, the UE 402 may detect a connection failure. If access stratum (AS) security has not been activated and the UE 402 has detected failure, the UE 402 may perform certain actions upon leaving an RRC connected state.

After a second connection 107b with the E-UTRAN 234 has failed, the suitable cell selection module 428 may select a suitable cell for a re-established second connection (not shown). If the suitable cell selection module 428 selects the second cell 196b, a re-establishment may be successful because the second eNB 160b includes second connection UE context information 198b.

The suitable cell selection module 428 may select the suitable cell from a prepared re-establishment candidate cells list. The prepared re-establishment candidate cells list may include cells that have access to second connection UE context information 198b-c (e.g., a list of prepared cells).

The suitable cell selection module 428 may detect a cell. Detecting a cell may include scanning a particular bandwidth or frequency for the cell. When selecting a suitable cell, the UE 402 may determine whether the cell that the UE 402 detected is a suitable cell. Determining whether a cell is a suitable cell may include determining whether a measured reference signal received power of the detected cell satisfies a cell selection criterion.

The UE operations module 424 may provide information 448 to the one or more receivers 420. For example, the UE operations module 424 may inform the receiver(s) 420 when or when not to receive transmissions based on downlink scheduling information or a discontinuous reception (DRX) configuration, etc.

The UE operations module 424 may provide information 438 to the demodulator 414. For example, the UE operations module 424 may inform the demodulator 414 of a modulation pattern anticipated for transmissions from the eNB 460.

The UE operations module 424 may provide information 436 to the decoder 408. For example, the UE operations module 424 may inform the decoder 408 of an anticipated encoding for transmissions from the eNB 460.

The UE operations module 424 may provide information 442 to the encoder 450. The information 442 may include data to be encoded and/or instructions for encoding. For example, the UE operations module 424 may instruct the encoder 450 to encode transmission data 446 and/or other information 442. The other information 442 may include RRC messages.

The encoder 450 may encode transmission data 446 and/or other information 442 provided by the UE operations module 424. For example, encoding the data 446 and/or other information 442 may involve error detection and/or correction coding, mapping data to space, time and/or frequency resources for transmission, multiplexing, etc. The encoder 450 may provide encoded data 452 to the modulator 454.

The UE operations module 424 may provide information 444 to the modulator 454. For example, the UE operations module 424 may inform the modulator 454 of a modulation type (e.g., constellation mapping) to be used for transmissions to the eNB 460. The modulator 454 may modulate the encoded data 452 to provide one or more modulated signals 456 to the one or more transmitters 458.

The UE operations module 424 may provide information 440 to the one or more transmitters 458. This information 440 may include instructions for the one or more transmitters 458. For example, the UE operations module 424 may instruct the one or more transmitters 458 when to transmit a signal to the eNB 460. The one or more transmitters 458 may upconvert and transmit the modulated signal(s) 456 to one or more eNBs 460.

The eNB 460 may include one or more transceivers 476, one or more demodulators 472, one or more decoders 466, one or more encoders 409, one or more modulators 413, a data buffer 462 and an eNB operations module 482. For example, one or more reception and/or transmission paths may be implemented in an eNB 460. For convenience, only a single transceiver 476, decoder 466, demodulator 472, encoder 409 and modulator 413 are illustrated in the eNB 460, though multiple parallel elements (e.g., transceivers 476, decoders 466, demodulators 472, encoders 409 and modulators 413) may be implemented.

The transceiver 476 may include one or more receivers 478 and one or more transmitters 417. The one or more receivers 478 may receive signals from the UE 402 using one or more antennas 480a-n. For example, the receiver 478 may receive and downconvert signals to produce one or more received signals 474. The one or more received signals 474 may be provided to a demodulator 472. The one or more transmitters 417 may transmit signals to the UE 402 using one or more antennas 480a-n. For example, the one or more transmitters 417 may upconvert and transmit one or more modulated signals 415.

The demodulator 472 may demodulate the one or more received signals 474 to produce one or more demodulated signals 470. The one or more demodulated signals 470 may be provided to the decoder 466. The eNB 460 may use the decoder 466 to decode signals. The decoder 466 may produce one or more decoded signals 464, 468. For example, a first eNB-decoded signal 464 may comprise received payload data, which may be stored in a data buffer 462. A second eNB-decoded signal 468 may comprise overhead data and/or control data. For example, the second eNB-decoded signal 468 may provide data (e.g., PUSCH transmission data) that may be used by the eNB operations module 482 to perform one or more operations.

In general, the eNB operations module 482 may enable the eNB 460 to communicate with the one or more UEs 402. The eNB operations module 482 may include a UE context information detection module 432, a UE context information preparation module 494 and a prepared re-establishment candidate cells list generation module 484.

The UE context information detection module 432 may detect whether UE context information 198a-c is stored on the eNB 460. For example, referring to FIG. 1, a UE context information detection module (not shown) on the second eNB 160b may detect whether second connection UE context information 198b-c is stored on the second eNB 160b. Because the second eNB 160b does include second connection UE context information 198b, the second cell 196b may be a prepared cell and may be in a prepared re-establishment candidate cells list.

If the UE context information detection module 432 detects that second connection UE context information 198b-c is stored on the eNB 460, the eNB 460 may re-establish the second connection 107b with the UE 402. By comparison, if the UE context information detection module 432 does not detect that second connection UE context information 198b-c is stored on the eNB 460, the second connection 107b may not be re-established.

An example of detecting UE context information 198a-c is given as follows. The eNB 460 may receive a connection re-establishment request message from the UE 402 that includes second connection UE context information (e.g., a ue_Identity field) for the UE 402. The eNB 460 may then compare the received UE context information with UE context information stored on the eNB 460. If the received UE context information matches stored UE context information, the eNB 460 may verify, and grant access to, the UE 402. More specifically, if a ue_Identity field in the received UE context information matches a ue_Identity field in stored UE context information, the eNB 460 may grant access to the UE 402.

The UE context information preparation module 494 may prepare the UE context information. For example, referring to FIG. 1, the first eNB 160a may attempt to add a second connection 107b between the UE 102 and the E-UTRAN 234 (e.g., via the second eNB 160b). In this example, a UE context information preparation module (not shown) on the first eNB 160a may provide second connection UE context information 198b to the second eNB 160b. In another example, during a handover procedure, a UE context information preparation module (not shown) on the first eNB 160a may provide second connection UE context information 198c to the third eNB 160c. In another example of a handover procedure, a UE context information preparation module (not shown) on the second eNB 160b may provide second connection UE context information 198c to the third eNB 160c. In some cases, the UE context information preparation module 494 may provide UE context information when there is a possibility of a failure around the region of another eNB 460.

The prepared re-establishment candidate cells list generation module 484 may generate a list of candidate cells for a re-established second connection 107b. The candidate cells may be cells that have access to second connection UE context information 198b-c (e.g., a list of prepared cells). The prepared re-establishment candidate cells list may be signaled to the UE 402 via RRC signaling or a broadcast transmission. From this list, the UE 402 may select a suitable cell for a re-established second connection (not shown).

The eNB operations module 482 may provide information 490 to the one or more receivers 478. For example, the eNB operations module 482 may inform the receiver(s) 478 when or when not to receive transmissions.

The eNB operations module 482 may provide information 488 to the demodulator 472. For example, the eNB operations module 482 may inform the demodulator 472 of a modulation pattern anticipated for transmissions from the UE(s) 402.

The eNB operations module 482 may provide information 486 to the decoder 466. For example, the eNB operations module 482 may inform the decoder 466 of an anticipated encoding for transmissions from the UE(s) 402.

The eNB operations module 482 may provide information 401 to the encoder 409. The information 401 may include data to be encoded and/or instructions for encoding. For example, the eNB operations module 482 may instruct the encoder 409 to encode transmission data 405 and/or other information 401. The other information 401 may include RRC messages.

The encoder 409 may encode transmission data 405 and/or other information 401 provided by the eNB operations module 482. For example, encoding the data 405 and/or other information 401 may involve error detection and/or correction coding, mapping data to space, time and/or frequency resources for transmission, multiplexing, etc. The encoder 409 may provide encoded data 411 to the modulator 413. The transmission data 405 may include network data to be relayed to the UE 402.

The eNB operations module 482 may provide information 403 to the modulator 413. This information 403 may include instructions for the modulator 413. For example, the eNB operations module 482 may inform the modulator 413 of a modulation type (e.g., constellation mapping) to be used for transmissions to the UE(s) 402. The modulator 413 may modulate the encoded data 411 to provide one or more modulated signals 415 to the one or more transmitters 417.

The eNB operations module 482 may provide information 492 to the one or more transmitters 417. This information 492 may include instructions for the one or more transmitters 417. For example, the eNB operations module 482 may instruct the one or more transmitters 417 when to (or when not to) transmit a signal to the UE(s) 402. The one or more transmitters 417 may upconvert and transmit the modulated signal(s) 415 to one or more UEs 402.

It should be noted that one or more of the elements or parts thereof included in the eNB(s) 460 and UE(s) 402 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 5:
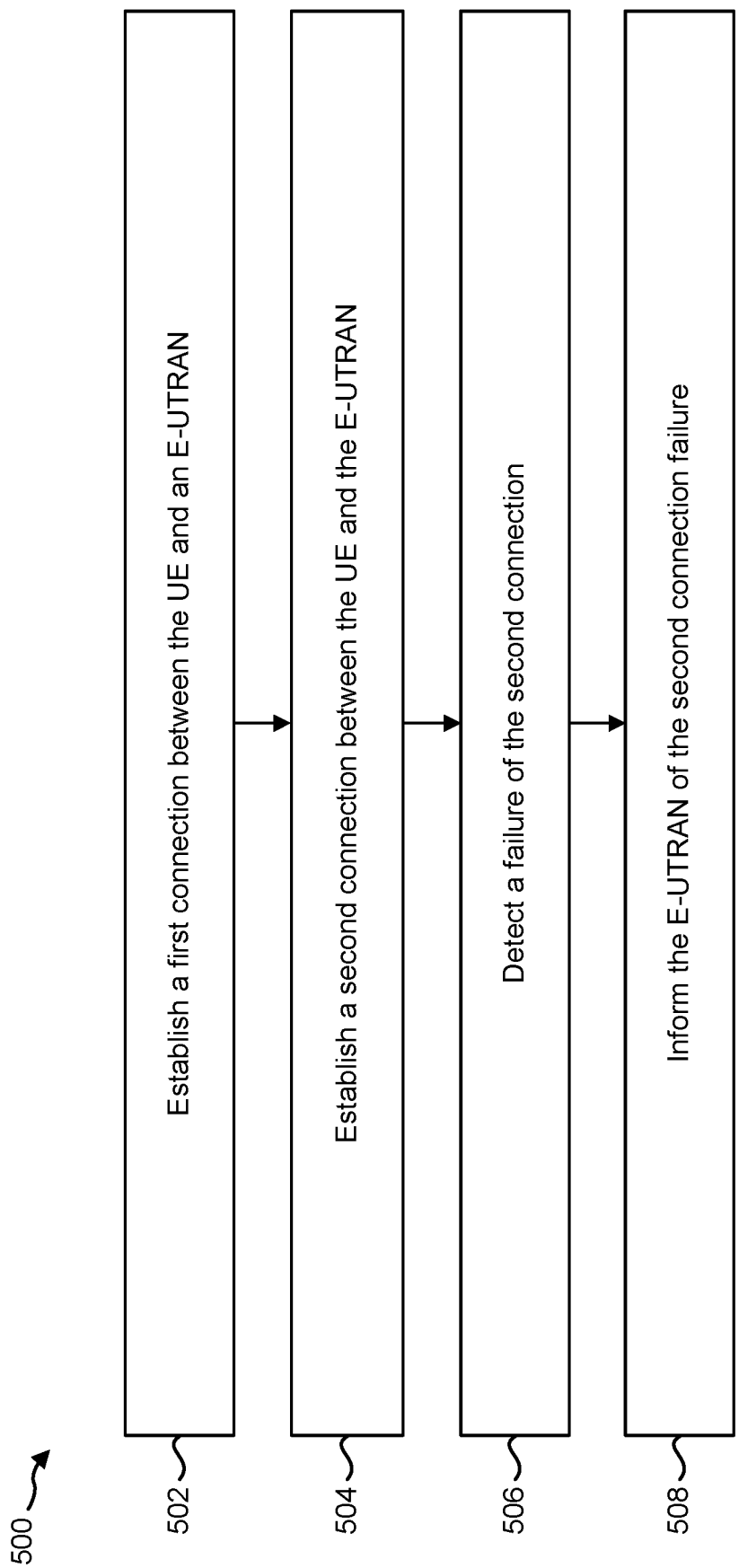
FIG. 5 is a flow diagram illustrating one configuration of a method for re-establishing a connection by a UE.

FIG. 5 is a flow diagram illustrating one configuration of a method 500 for re-establishing a connection by a UE 102. The UE 102 may establish 502 a first connection 107a between the UE 102 and an E-UTRAN 234. For example, the UE 102 may establish 502 a first connection 107a with the first eNB 160a of the E-UTRAN 234. In one configuration, the UE 102 may connect to the first eNB 160a with a Uu interface. Via the first connection 107a, the UE 102 may send information to and receive information from the E-UTRAN 234.

Similarly, the UE 102 may establish 504 a second connection 107b between the UE 102 and the E-UTRAN 234. For example, the UE 102 may establish 504 a second connection 107b with the second eNB 160b of the E-UTRAN 234. The UE 102 may connect to the second eNB 160b with a Uux interface. Via the second connection 107b, the UE 102 may send information to and receive information from the E-UTRAN 234.

The UE 102 may detect 506 a failure of the second connection 107b. For example, the UE 102 may detect 506 one or more of a radio link failure, a handover failure, an E-UTRA mobility failure, an integrity check failure and a reconfiguration failure. After detecting a connection failure, the UE 102 may inform 508 the E-UTRAN 234 of the second connection 107b failure. As will be described in detail below, the UE 102 may inform 508 the E-UTRAN 234 of the second connection 107b failure by using the first connection 107a or by using a re-established second connection (not shown). For example, if a suitable cell is detected, the UE 102 may inform 508 the E-UTRAN 234 using the re-established second connection (not shown). By comparison, if a suitable cell is not detected, the UE 102 may inform 508 the E-UTRAN 234 using the first connection 107a.

Figure 6:
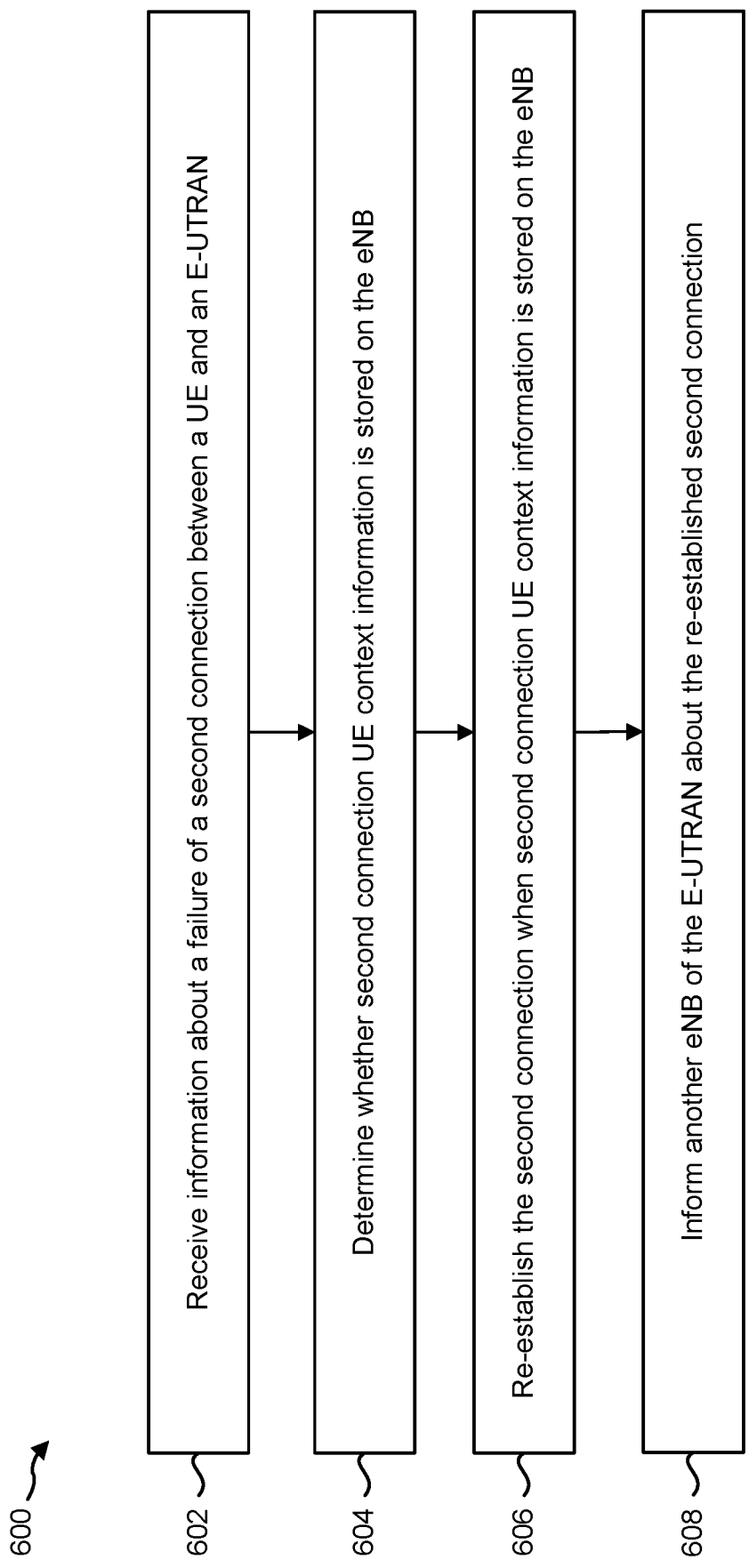
FIG. 6 is a flow diagram illustrating one configuration of a method for re-establishing a connection by an eNB.

FIG. 6 is a flow diagram illustrating one configuration of a method 600 for re-establishing a connection by an eNB 160. The eNB 160 may receive 602 information about a failure of a second connection 107b between the UE 102 and the E-UTRAN 234. For example, the second eNB 160b may receive a connection re-establishment request message from the UE 102 that indicates that a second connection 107b has failed and that identifies the cause of the failure.

The eNB 160 may then determine 604 whether second connection UE context information 198b-c is stored on the eNB 160. For example, the second eNB 160b may determine 604 whether second connection UE context information 198b is stored on the second eNB 160b.

The eNB 160 may re-establish 606 the second connection 107b when second connection UE context information 198b is stored on the eNB 160. Re-establishing 606 the second connection 107b may include sending a connection re-establishment message to the UE 102 as described in connection with FIG. 2. In response, the UE 102 may send a connection re-establishment complete message, and a second connection 107b may be re-established. The eNB 160 may be configured so that if the eNB 160 determines 604 that second connection UE context information 198b-c is not stored on the eNB 160, the eNB 160 does not re-establish 606 the second connection 107b.

Once the second connection 107b has been re-established, the eNB 160 may inform 608 another eNB about the re-established second connection with the UE 102. For example, the second eNB 160b may notify the first eNB 160a that a second connection 107b has been re-established with the UE 102.

Figure 7:
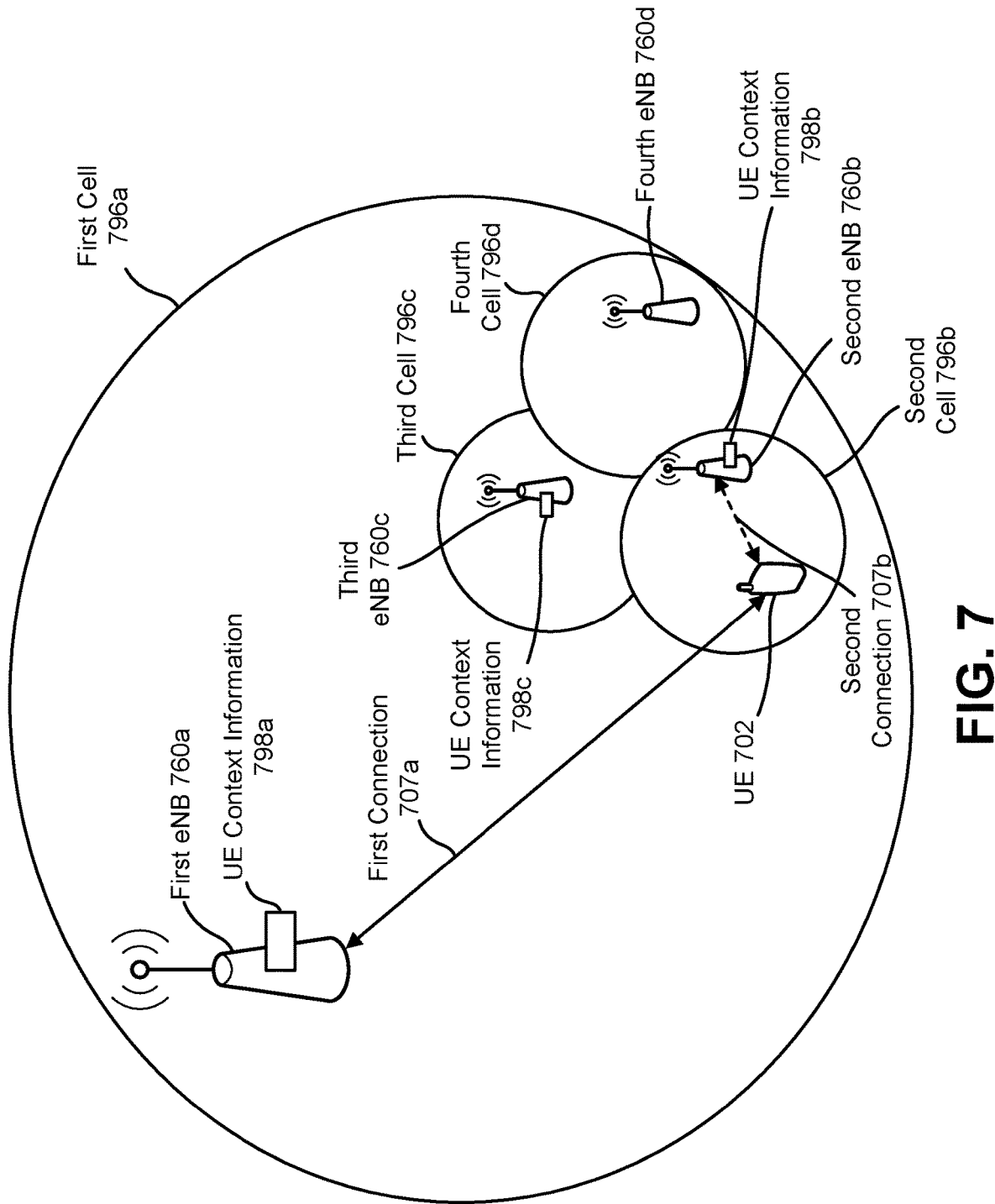
FIG. 7 is a block diagram illustrating an addition of a second connection between a UE and an eNB.

FIG. 7 is a block diagram illustrating an addition of a second connection 707b between a UE 702 and an eNB 760b. The UE 702, eNBs 760a-d, cells 796a-d, connections 707a-b and UE context information 798a-c may be examples of corresponding elements described in connection with FIG. 1. To implement dual connectivity, the UE 702 may add a second connection 707b. For example, the UE 702 having a first connection 707a with the first eNB 760a may establish a second connection 707b with the second eNB 760. Before establishing the second connection 707b, the E-UTRAN 234 may prepare and signal the second connection UE context information 798b to the second eNB 760b. As described above, the second connection UE context information 798b may be all, or part of, the first connection UE context information 798a. The E-UTRAN 234 may then signal the UE 702 to establish the second connection 707b, for example using the method 200 described in connection with FIG. 2.

Figure 8:
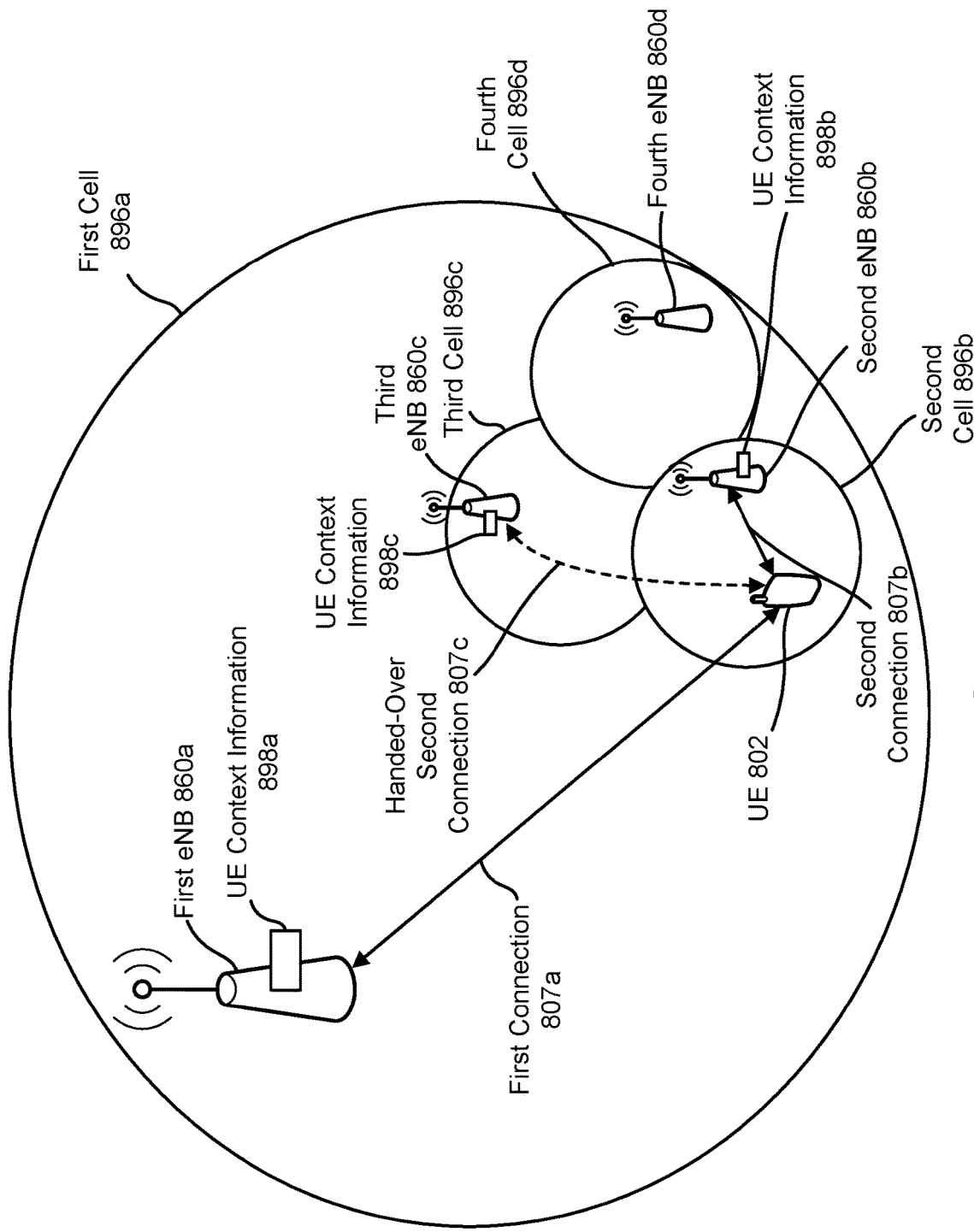
FIG. 8 is a block diagram illustrating a handover of a second connection between a UE and multiple eNBs.

FIG. 8 is a block diagram illustrating a handover of a second connection between a UE 802 and multiple eNBs 860b-c. The UE 802, eNBs 860a-d, cells 896a-d, connections 807a-c and UE context information 898a-c may be examples of corresponding elements described in connection with FIG. 1. To maintain dual connectivity, the UE 802 may hand over the second connection 807b. For example, the UE 802 having a first connection 807a with the first eNB 860a and a second connection 807b with the second eNB 860b may change the cells pertaining to the second connection 807b from the second cell 896b to the third cell 896c. In other words, the second connection 807b between the UE 802 and the second eNB 860b may be replaced with a handed-over second connection 807c between the UE 802 and the third eNB 860c. Before handing over the second connection 807b, and establishing the handed-over second connection 807c, the E-UTRAN 234 may prepare and signal second connection UE context information 898c to the third eNB 860c for establishing the handed-over second connection 807c. As described above, the second connection UE context information 898c may be all, or part of, the first connection UE context information 898a. The E-UTRAN 234 may then signal the UE 802 to establish the handed-over second connection 807*c*, for example using the method 200 described in connection with FIG. 2.

Figure 9:
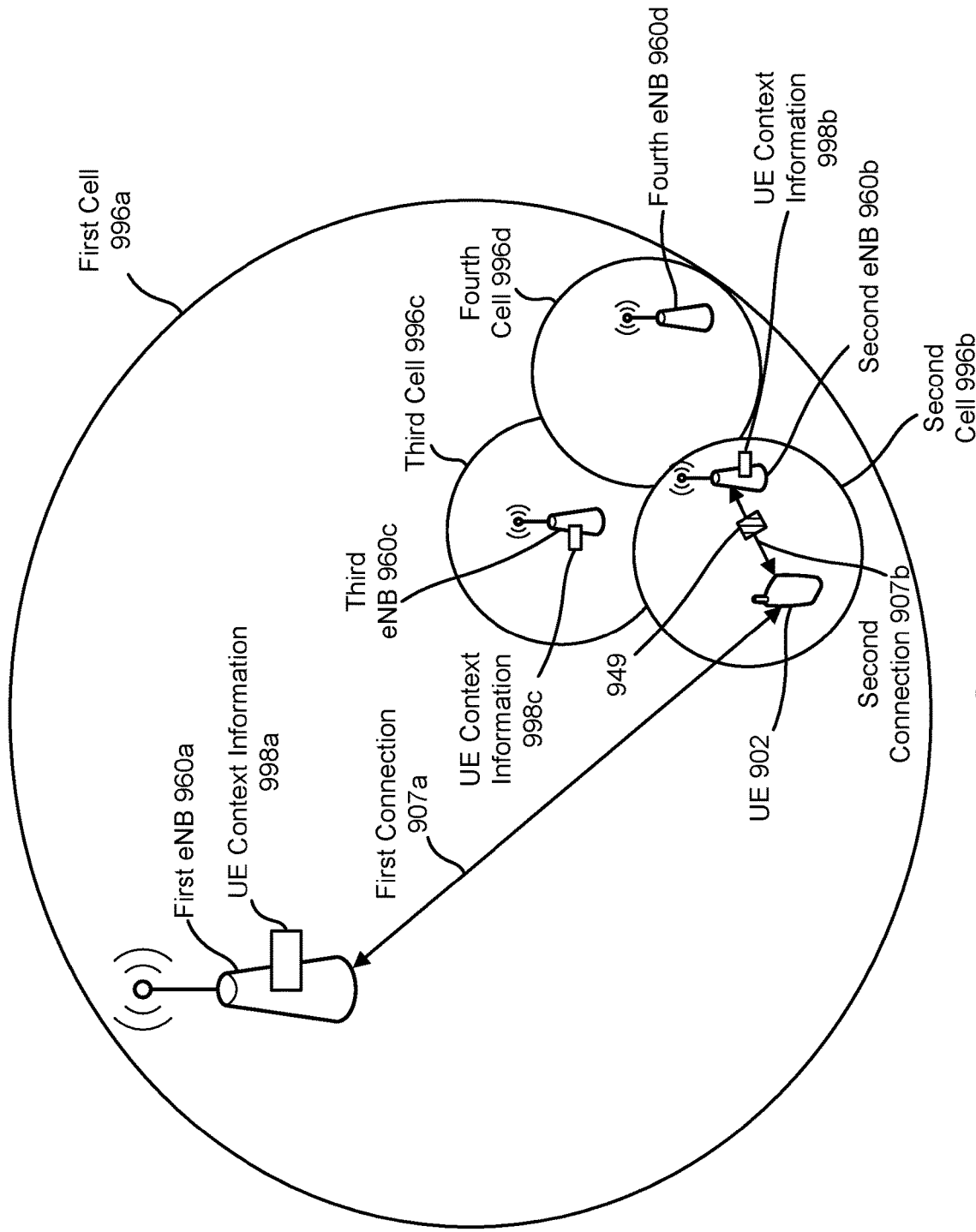
FIG. 9 is a block diagram illustrating a failure of a second connection between a UE and an eNB.

FIG. 9 is a block diagram illustrating a failure of a second connection 907*b* between a UE 902 and an eNB 960*b*. The UE 902, eNBs 960*a-d*, cells 996*a-d*, connections 907*a-b* and UE context information 998*a-c* may be examples of corresponding elements described in connection with FIG. 1. As described above, during dual connectivity, one of the connections may experience a connection failure, indicated in FIG. 9 by the box 949. For example, the second connection 907*b* may experience a radio link failure, a handover failure, an E-UTRA mobility failure, an integrity check failure or a reconfiguration failure as described in connection with FIG. 4. In this example, to maintain dual connectivity, the second connection 907*b* may be re-established as described in connection with FIGS. 5 and 6.

Figure 10:
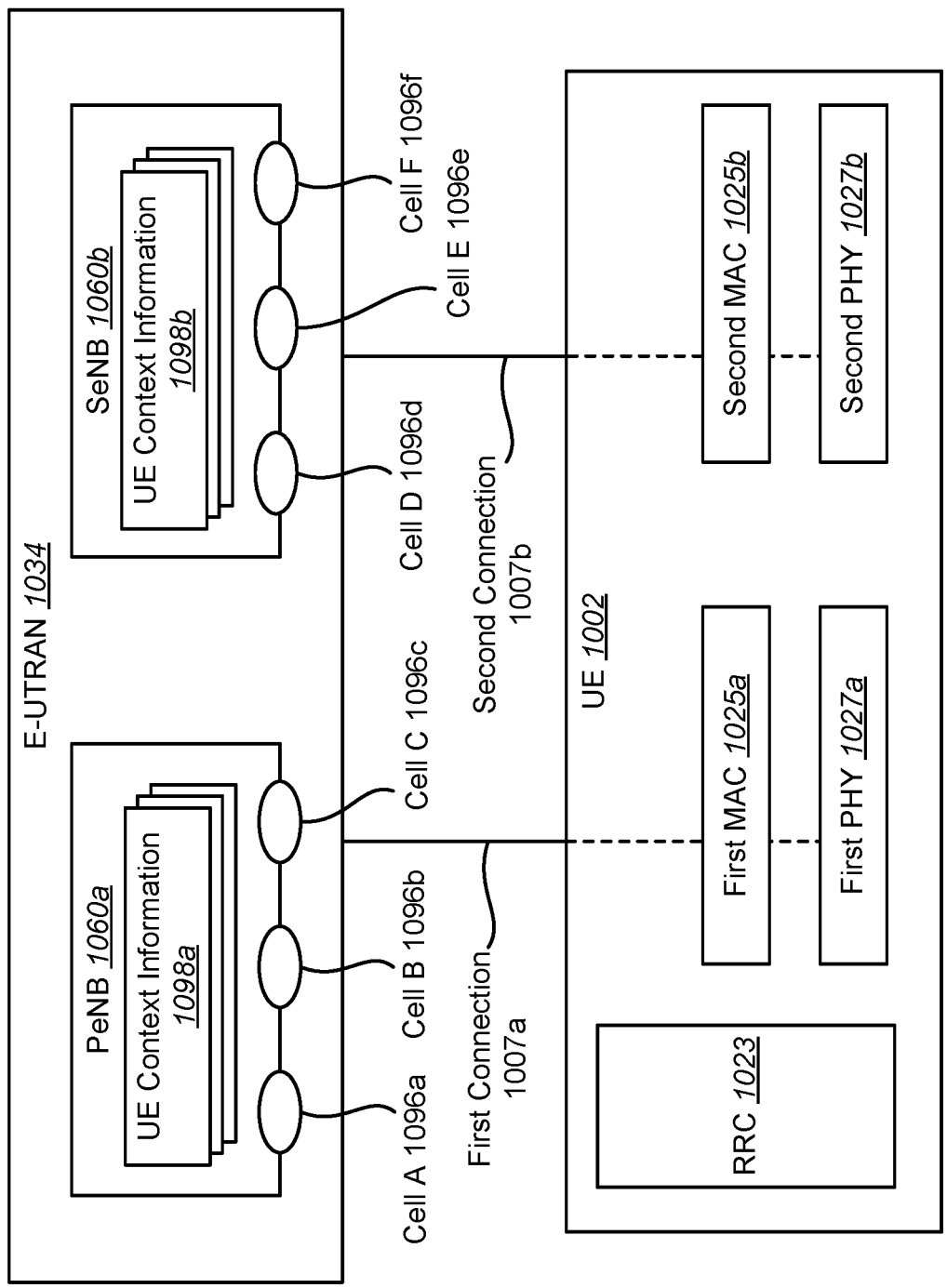
FIG. 10 is a block diagram illustrating one configuration of an E-UTRAN and a UE in which systems and methods for re-establishing a connection may be implemented.

FIG. 10 is a block diagram illustrating one configuration of an E-UTRAN 1034 and a UE 1002 in which systems and methods for re-establishing a connection may be implemented. The UE 1002, E-UTRAN 1034, UE context information 1098*a-b*, cells 1096*a-f* and connections 1007*a-b* may be examples of corresponding elements described in connection with at least one of FIGS. 1 and 2.

The E-UTRAN 1034 may include a PeNB 1060*a* and an SeNB 1060*b*. The UE 1002 may communicate with the PeNB 1060*a* via the first connection 1007*a*. The UE 1002 may communicate with the SeNB 1060*b* via the second connection 1007*b*. The PeNB 1060*a* and SeNB 1060*b* may be implemented in accordance with the eNB 160 described in connection with FIG. 1.

The PeNB 1060*a* may provide multiple cells 1096*a-c* for connection to one or more UEs 1002. For example, the PeNB 1060*a* may provide cell A 1096*a*, cell B 1096*b* and cell C 1096*c*. Similarly, the SeNB 1060*b* may provide multiple cells 1096*d-f*. The UE 1002 may be configured to transmit/receive on one or more cells (e.g., cell A 1096*a*, cell B 1096*b* and cell C 1096*c*) for the first connection 1007*a* (e.g., a primary Uu interface). The UE 1002 may also be configured to transmit/receive on one or more other cells (e.g., cell D 1096*d*, cell E 1096*e* and cell F 1096*f*) for the second connection 1007*b* (e.g., a secondary Uu interface). If the UE 1002 is configured to transmit/receive on multiple cells 1096*a-f* for a radio connection 1007*a-b*, a carrier aggregation operation may be applied to the radio connection 1007*a-b*.

The PeNB 1060*a* may manage and store first connection UE context information 1098*a* for each UE 1002 using the configured cells 1096*a-c*. In a similar fashion, the SeNB 1060*b* may manage and store second connection UE context information 1098*b* for each UE 1002 using the configured cells 1096*d-f*. The PeNB 1060*a* may also store and manage second connection UE context information 1098*b*. Accordingly, an eNB may behave as both the PeNB 1060*a* and the SeNB 1060*b*.

One MAC entity 1025*a-b* and one PHY entity 1027*a-b* may be mapped to one connection 1007*a-b*. For example, a first MAC entity 1025*a* and a first PHY entity 1027*a* may be mapped to the first connection 1007*a*. Similarly, a second MAC entity 1025*b* and a second PHY entity 1027*b* may be mapped to the second connection 1007*b*.

The UE 1002 may include an RRC entity 1023. The RRC entity 1023 may receive RRC messages (e.g., RRC connection re-establishment message, addition of connection command, handover command, etc.) from an RRC entity (not shown) of the E-UTRAN 1034. The RRC entity 1023 may also transmit RRC messages (e.g., RRC connection re-establishment request message, RRC connection re-establishment complete message) to the RRC entity (not shown) of the E-UTRAN 1034. The RRC entity 1023 may also store the UE context information 1098*a-b*.

It should be noted that the UE 1002 may not be required to be aware of the PeNB 1060*a* and the SeNB 1060*b*, as long as the UE 1002 is aware of the multiple Uu interfaces with the E-UTRAN 1034. In one configuration, the UE 1002 may see an eNB as a point on the E-UTRAN 1034. In another configuration, the UE 1002 may see the multiple Uu interfaces with the E-UTRAN 1034 as connections with multiple points on the E-UTRAN 1034. In another configuration, the E-UTRAN 1034 may provide multiple Uu interfaces with the same or different eNBs. For instance, the PeNB 1060*a* and the SeNB 1060*b* may be the same eNB. The multiple Uu interfaces (e.g., multi-connectivity) may be achieved by a single eNB. In other words, in one configuration, the systems and methods described herein may be achieved by a single eNB or a single scheduler. The UE 1002 may be able to connect more than one Uux interface (e.g., Uu1, Uu2, Uu3, etc.). Each Uu interface may be used to perform carrier aggregation. Accordingly, the UE 1002 may be configured with more than one set of serving cells in a carrier aggregation scenario.

It should be noted that while multiple Uu interfaces are described, the systems and methods described herein may be realized by a single Uu interface or a single radio connection depending on the definition of interface. For example, a radio interface may be defined as an interface between the UE 1002 and the E-UTRAN 1034. In this definition, the interface may not be an interface between the UE 1002 and the eNB. For example, one radio interface may be defined as an interface between the UE 1002 and the E-UTRAN 1034 with multi-connectivity. Accordingly, the Uu interface and the Uux interface discussed above may be considered as different characteristics of cells. For instance, the Uu interface may be a first set of cell(s) and the Uux interface may be a second set of cell(s). Also, the first radio interface may be rephrased as a first set of cell(s) and the second radio interface may be rephrased as a second set of cell(s).

Figure 11:
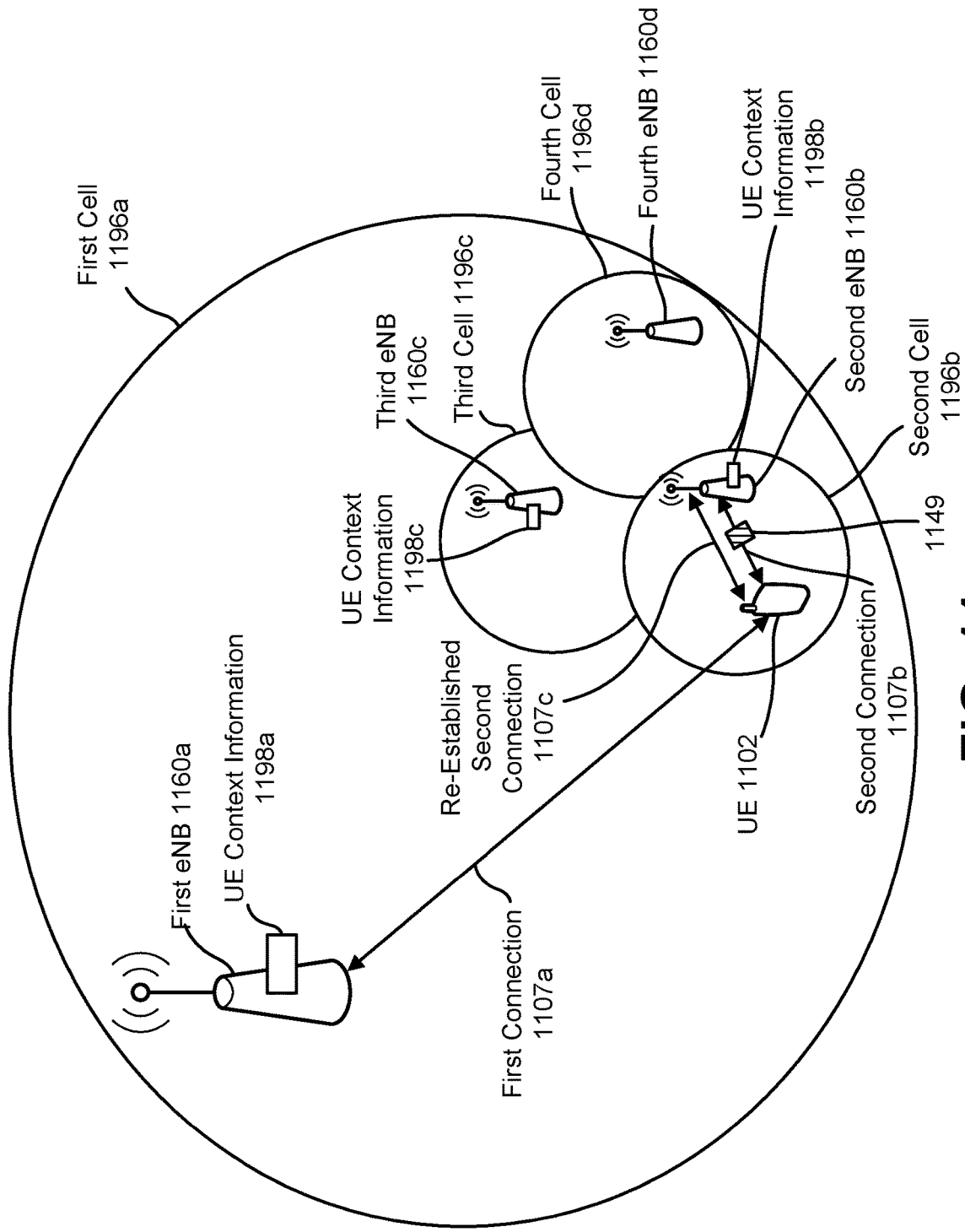
FIG. 11 is a block diagram illustrating one configuration of a UE and multiple eNBs in which systems and methods for re-establishing a connection may be implemented.

FIG. 11 is a block diagram illustrating one configuration of a UE 1102 and multiple eNBs 1160*a-d* in which systems and methods for re-establishing a connection may be implemented. More specifically, FIG. 11 depicts re-establishing a second connection with a serving cell or a source cell. The UE 1102, eNBs 1160*a-d*, cells 1196*a-d*, connections 1107*a-c* and UE context information 1198*a-c* may be examples of corresponding elements described in connection with FIG. 1. Re-establishing a connection with a serving cell may be triggered by a radio link failure, an addition of connection failure, an integrity check failure or a reconfiguration failure. Re-establishing a connection with a source cell may be triggered by a handover failure.

An example of re-establishing a connection with a serving cell is given as follows. The UE 1102 may have a second connection 1107*b* with the second eNB 1160*b*. In other words, the second cell 1196*b* may be a serving cell for the second connection 1107*b*. Upon detecting a failure 1149 of the second connection 1107*b*, the UE 1102 may select a suitable cell (e.g., the second cell 1196*b*) and try to obtain a re-established second connection 1107*c* with the second eNB 1160*b*.

An example of re-establishing a connection with a source cell is given as follows. The UE 1102 may have a second connection 1107*b* with the second eNB 1160*b*. The UE 1102 may attempt to hand over the second connection 1107*b* from the second cell 1196*b* to the third cell 1196*c*. In other words, the second cell 1196*b* may be a source cell for the second connection 1107b. Upon detecting a handover failure 1149 of the second connection 1107b, the UE 1102 may select a suitable cell (e.g., the second cell 1196b) and try to obtain a re-established second connection 1107c with the second eNB 1160b.

Figure 12:
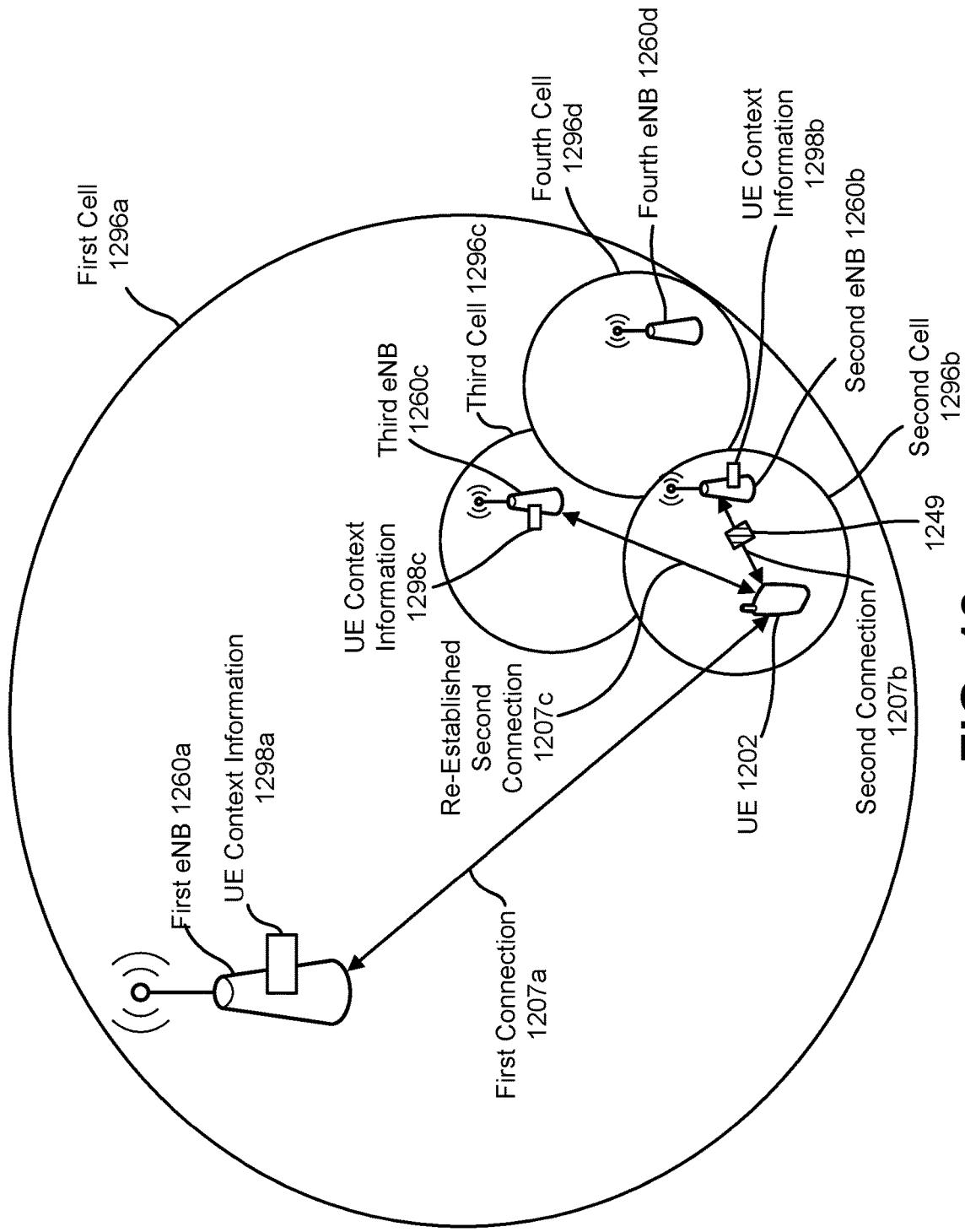
FIG. 12 is a block diagram illustrating another configuration of a UE and multiple eNBs in which systems and methods for re-establishing a connection may be implemented.

FIG. 12 is a block diagram illustrating one configuration of a UE 1202 and multiple eNBs 1260a-d in which systems and methods for re-establishing a connection may be implemented. More specifically, FIG. 12 depicts re-establishing a second connection with a non-serving cell or a target cell. The UE 1202, eNBs 1260a-d, cells 1296a-d, connections 1207a-c and UE context information 1298a-c may be examples of corresponding elements described in connection with FIG. 1. Re-establishing a connection with a non-serving cell may be triggered by a radio link failure, a connection addition failure, an integrity check failure or a reconfiguration failure. Re-establishing a connection with a target cell may be triggered by a handover failure.

An example of re-establishing a connection with a non-serving cell is given as follows. The UE 1202 may have a second connection 1207b with the second eNB 1260b. In other words, the second cell 1296b may be a serving cell for the second connection 1207b. Accordingly, the third cell 1296c may be a non-serving cell. Upon detecting a failure 1249 of the second connection 1207b, the UE 1202 may select a suitable cell (e.g., the third cell 1296c) and try to obtain a re-established second connection 1207c with the third eNB 1260c.

An example of re-establishing a connection with a target cell is given as follows. The UE 1202 may have a second connection 1207b with the second eNB 1260b. The UE 1202 may attempt to hand over the second connection 1207b from the second cell 1296b to the third cell 1296c. In other words, the second cell 1296b may be a source cell for the second connection 1207b and the third cell 1296c may be a target cell for the second connection 1207b. Upon detecting a handover failure 1249 of the second connection 1207b, the UE 1202 may select a suitable cell (e.g., the third cell 1296c) and try to obtain a re-established second connection 1207c with the third eNB 1260c.

Figure 13:
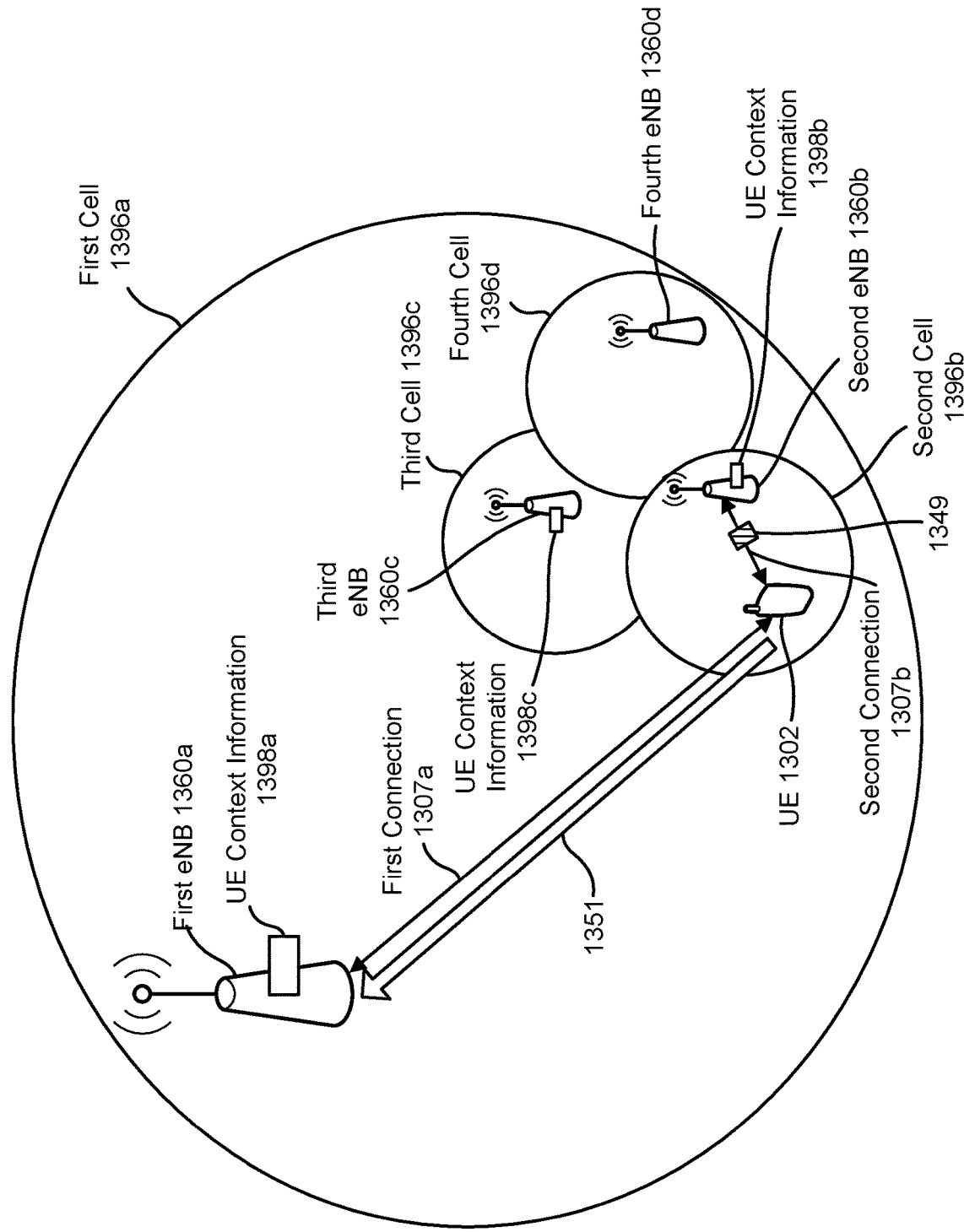
FIG. 13 is a block diagram illustrating another configuration of a UE and multiple eNBs in which systems and methods for re-establishing a connection may be implemented.

FIG. 13 is a block diagram illustrating one configuration of a UE 1302 and multiple eNBs 1360a-d in which systems and methods for re-establishing a connection may be implemented. The UE 1302, eNBs 1360a-d, cells 1396a-d, connections 1307a-b and UE context information 1398a-c may be examples of corresponding elements described in connection with FIG. 1. As described above, a suitable cell may not be detected or selected. In these examples, the UE 1302 may notify the E-UTRAN 234 of the failure of the second connection 1307b via the first connection 1307a. An example is given as follows. A UE 1302 configured with a first connection 1307a and a second connection 1307b may detect a failure 1349 of the second connection 1307b. The UE 1302 may then select a suitable cell (e.g., the fourth cell 1396d) and try to obtain a re-established second connection with the fourth eNB 1360d. As illustrated by this example, the UE 1302 may select a non-prepared cell (e.g., the fourth cell 1396d) as a suitable cell. However, a re-established second connection may not be established because the fourth eNB 1360d does not include UE context information. In other words, the fourth cell 1396d may not be a prepared cell for re-establishment and the UE 1302 may release the second connection 1307b.

In another example, the UE 1302 may avoid trying to obtain a re-established second connection with the fourth cell 1396d. For example, if the UE 1302 has determined that the fourth cell 1396d is not a prepared cell, the UE 1302 may avoid trying to obtain a re-established second connection with the fourth eNB 1360d. As described above, the UE 1302 may have determined that the fourth cell 1396d is not a prepared cell based on the prepared re-establishment candidate cells list.

In one example, if the UE 1302 does not find any suitable cell from the prepared re-establishment candidate cells list, the UE 1302 may inform the first eNB 1360a of the failure of the second connection 1307b, as indicated by the arrow 1351. The first eNB 1360a may then check the UE context information 1398a stored on the first eNB 1360a and may inform the second eNB 1360b of the released second connection 1307b.

Figure 14:
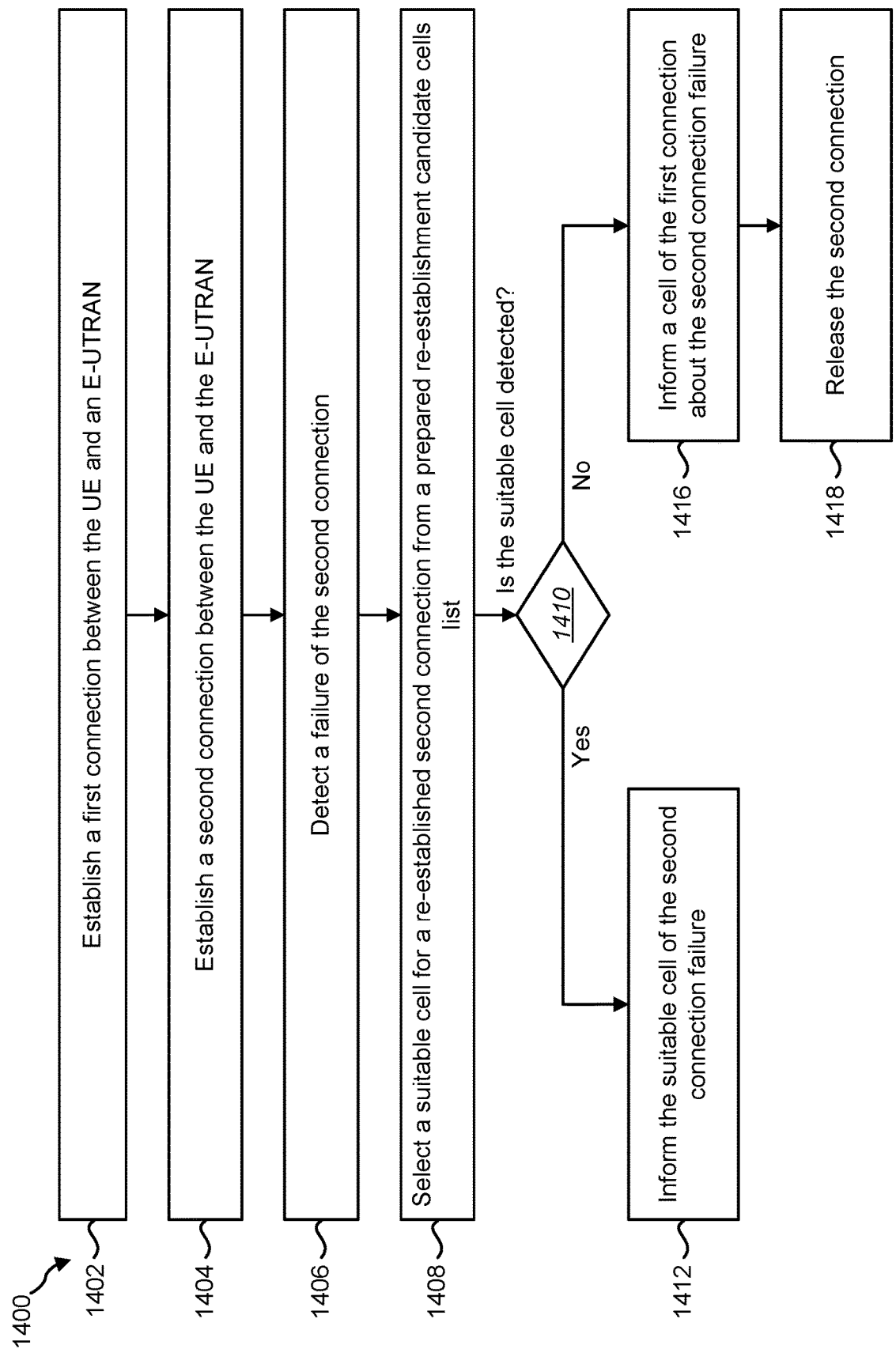
FIG. 14 is a flow diagram illustrating a more specific configuration of a method for re-establishing a connection by a UE.

FIG. 14 is a flow diagram illustrating a more specific configuration of a method 1400 for re-establishing a connection by a UE 102. The UE 102 may establish 1402 a first connection 107a between the UE 102 and an E-UTRAN 234. This may be done as described in connection with FIG. 5.

The UE 102 may establish 1404 a second connection 107b between the UE 102 and the E-UTRAN 234. This may be done as described in connection with FIG. 5.

The UE 102 may detect 1406 a failure of the second connection 107b. This may be done as described in connection with FIG. 5.

The UE 102 may select 1408 a suitable cell for a re-established second connection 1107c from a prepared re-establishment candidate cells list. As described above, the E-UTRAN 234 may provide a prepared re-establishment candidate cells list that includes cells that have access to second connection UE context information 198b-c. A cell 196 may have access to second connection UE context information 198b-c if the eNB 160 that provides the cell 196 stores second connection UE context information 198b-c. The list may be signaled to the UE 102 via RRC messaging or broadcast messaging.

From this list, the UE 102 may select 1408 a suitable cell. In some examples, the suitable cell may be a source cell or a target cell (relating to a handover failure) or a serving cell or a non-serving cell (relating to a radio link failure or an addition of connection failure).

During selection of a suitable cell, the UE 102 may determine 1410 if the suitable cell is detected. For example, the UE 102 may determine whether a measured RSRP of a cell may be fulfilled with (or satisfy) a cell selection criterion, etc. If the UE 102 determines 1410 that a suitable cell is detected, the UE 102 may inform 1412 the suitable cell of the second connection failure. For example, the UE 102 may send a connection re-establishment request message as described in connection with FIG. 2. As a result, a re-established second connection 1107c may be obtained.

By comparison, if the UE 102 determines 1410 that a suitable cell is not detected, the UE 102 may inform 1416 a cell 196 of the first connection about the second connection failure. For example, the UE 102 may inform the first eNB 160a about the failure of the second connection 107b. The UE 102 may then release 1418 the second connection 107b. In this example, the first eNB 160a may notify the second eNB 160b of the release of the second connection 107b.

Figure 15:
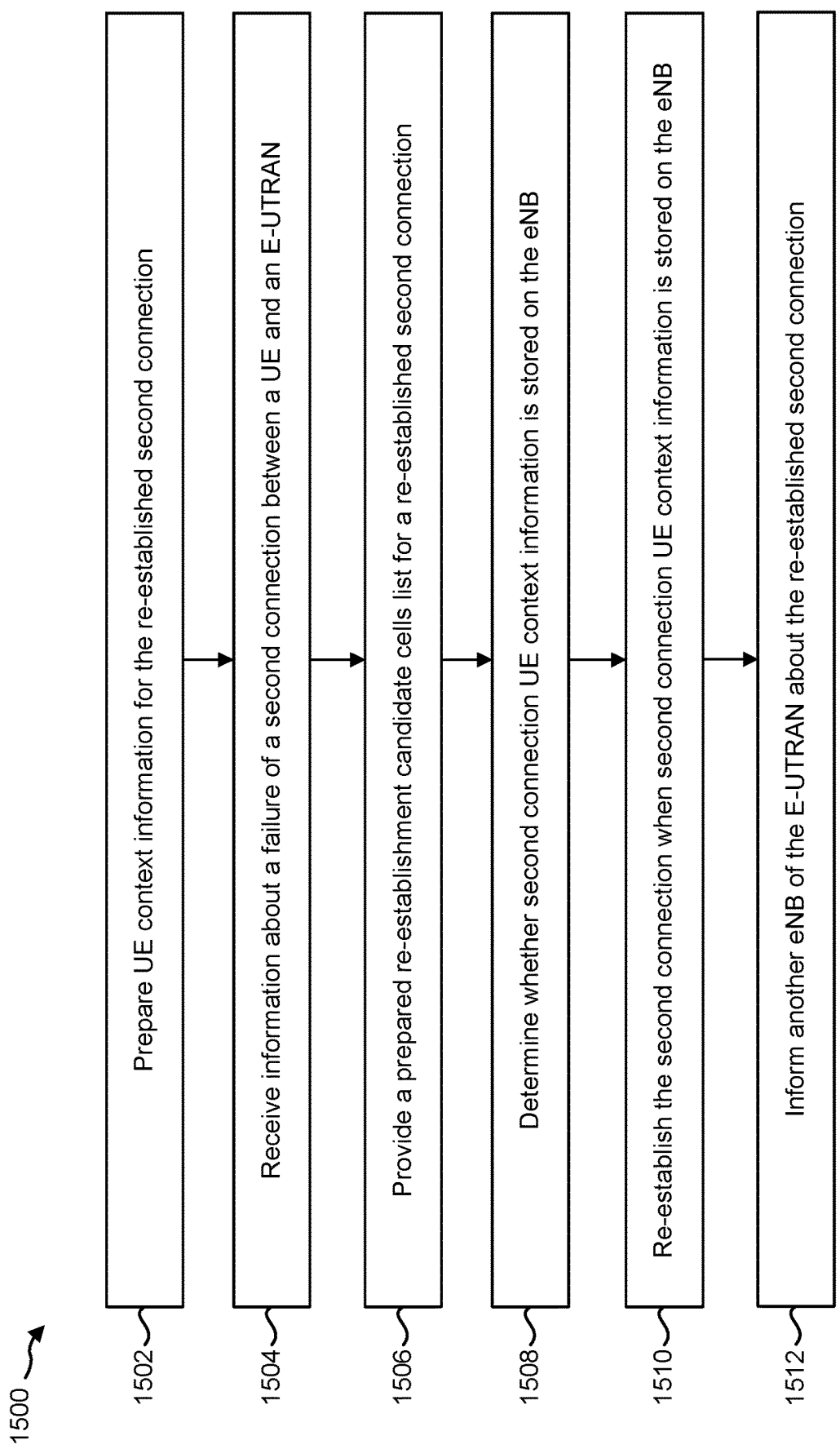
FIG. 15 is a flow diagram illustrating a more specific configuration of a method for re-establishing a connection by an eNB.

FIG. 15 is a flow diagram illustrating a more specific configuration of a method 1500 for re-establishing a connection by an eNB 1160. The eNB 1160 may prepare 1502 UE context information 1198a-c for the re-established second connection 1107c. As described above, a re-established second connection 1107c may be established if a suitable cell with UE context information 1198a-c is detected. Accordingly, before instructing a UE 1102 to perform a handover, or add a new connection, the eNB 1160 may provide UE context information 1198*a-c* to one or more cells, rendering those cells prepared cells. In some implementations, the eNB 1160 may signal UE context information 1198*a-c* to eNBs where there is the potential to be a connection failure in the region.

The eNB 1160 may then receive 1504 information about a failure of the second connection 1107*b* between the UE 1102 and the E-UTRAN 234. This may be done as described in connection with FIG. 6.

The eNB 1160 may provide 1506 a prepared re-establishment candidate cells list for a re-established second connection 1107*c*. As described above, the E-UTRAN 234 may provide one or more cells with UE context information 1198*a-c*. Accordingly, the cells with the UE context information 1198*a-c* are prepared to re-establish a second connection. The eNB 1160 may compile a list of these prepared cells, and signal the list to the UE 1102, via RRC messaging for example.

The eNB 1160 may determine 1508 whether second connection UE context information 1198*b-c* is stored on the eNB 1160. This may be done as described in connection with FIG. 6.

The eNB 1160 may re-establish 1510 the second connection when second connection UE context information 1198*b-c* is stored on the eNB 1160. This may be done as described in connection with FIG. 6.

The eNB 1160 may inform 1512 another eNB of the E-UTRAN 234 about the re-established second connection 1107*c*. This may be done as described in connection with FIG. 6.

Figure 16:
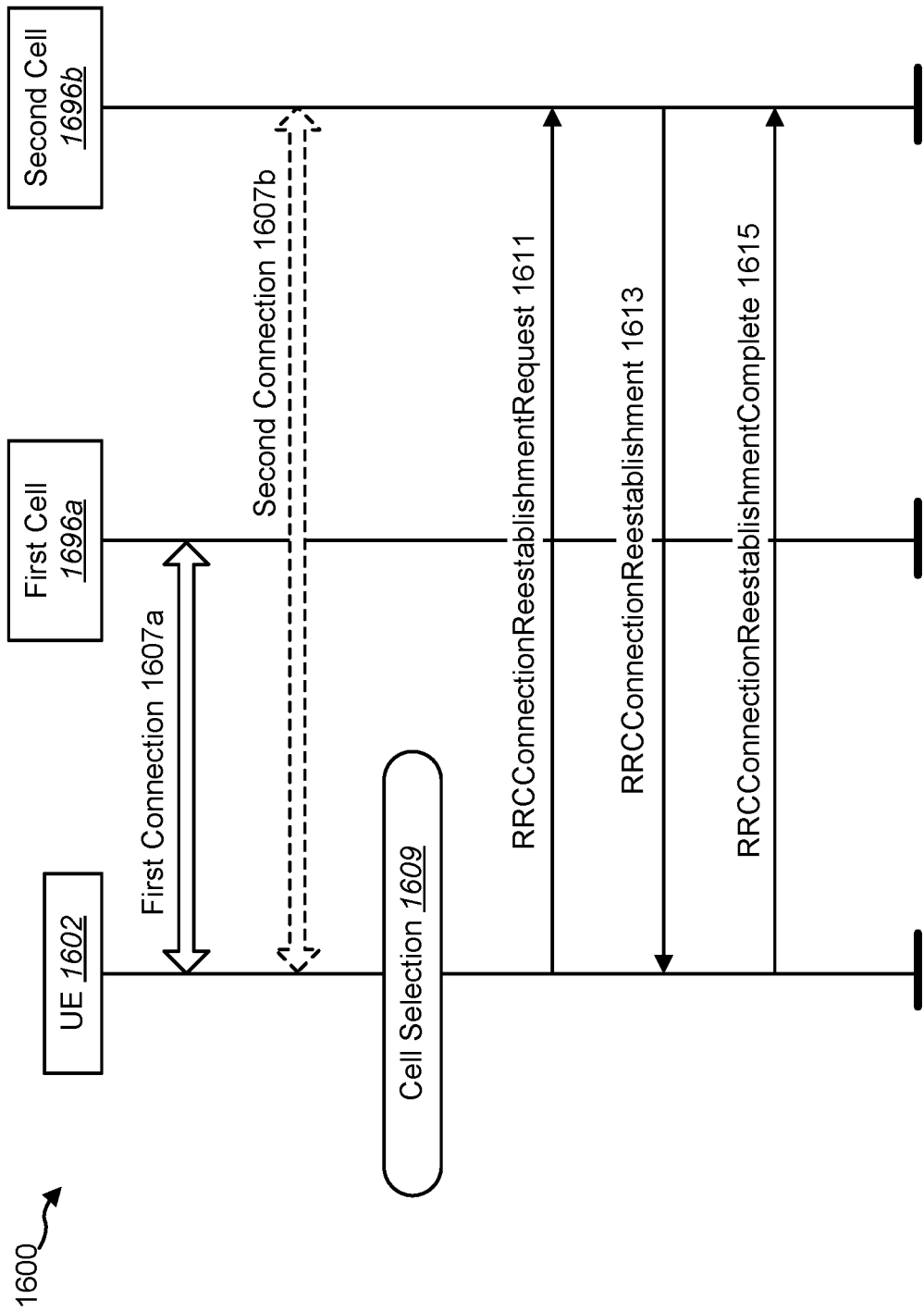
FIG. 16 is a thread diagram illustrating one configuration for re-establishing a connection.

FIG. 16 is a thread diagram illustrating one configuration 1600 for re-establishing a connection. The UE 1602, first cell 1696*a*, the second cell 1696*b*, first connection 1607*a* and second connection 1607*b* may be examples of corresponding elements described in connection with FIG. 1. In some examples, the first cell 1696*a* may be provided by an eNB 160. The second cell 1696*b* may be provided by the same, or a different eNB 160. As described above, the second connection 1607*b* may experience a connection failure. In this example, the UE 1602 may select 1609 a suitable cell (e.g., the second cell 1696*b*) from cells listed in a prepared re-establishment candidate cells list and may attempt to re-establish the second connection 1607*b*. For example, the UE 1602 may evaluate a cell listed in the prepared re-establishment candidate cells list in a certain priority order and the UE 1302 may determine if it is a suitable cell (e.g., based on the RSRP of the cell). Then if a suitable cell belonging to the prepared re-establishment candidate cells list is found, the UE 1602 may inform the suitable cell (i.e., an eNB) about the failure of the second connection 1607*b*.

The UE 1602 may then send 1611 a connection re-establishment request message to the second cell 1696*b* (i.e., an eNB). This may be done as described in connection with FIG. 2. Sending 1611 a connection re-establishment request message may include setting the contents of the connection re-establishment message. An example is given as follows.

The UE 1602 may set a ue-Identity in the connection re-establishment message as follows. The UE 1602 may set a cell Radio Network Temporary Identifier (C-RNTI) field to the C-RNTI used in the source cell (e.g., PCell) of the second connection 1607*b* for a handover failure, or in other cases, to the C-RNTI used in the cell of the second connection 1607*b* (e.g., PCell) in which the trigger for the re-establishment occurred. The UE 102 may set a physCellId field to the physical cell identity of the source cell (e.g., PCell) of the second connection 1607*b* for a handover failure, or of the cell (e.g., PCell) of the second connection 1607*b* in which the trigger for the re-establishment occurred. The UE 1602 may set a shortMAC-I field to the 16 least significant bits of the MAC-I calculated. The UE 1602 may also set a reestablishmentCause field as follows. If the re-establishment procedure was initiated due to reconfiguration failure, the UE 1602 may set the reestablishmentCause field to the value reconfigurationFailure. If the re-establishment procedure was initiated due to a handover failure, the UE 1602 may set the reestablishmentCause field to the value handoverFailure. For other cases, the UE 1602 may set the reestablishmentCause field to the value otherFailure. The UE 1602 may then submit the connection re-establishment request message to a lower layer of the UE 1602 (e.g., at least one of the PDCP, the RLC, the MAC or the PHY layer) of the second connection for transmission.

The second cell 1696*b* (i.e., an eNB) may then send 1613 a connection re-establishment message. This may be done as described in connection with FIG. 2.

In response, the UE 1602 may send 1615 a connection re-establishment complete message. This may be done as described in connection with FIG. 2.

Figure 17:
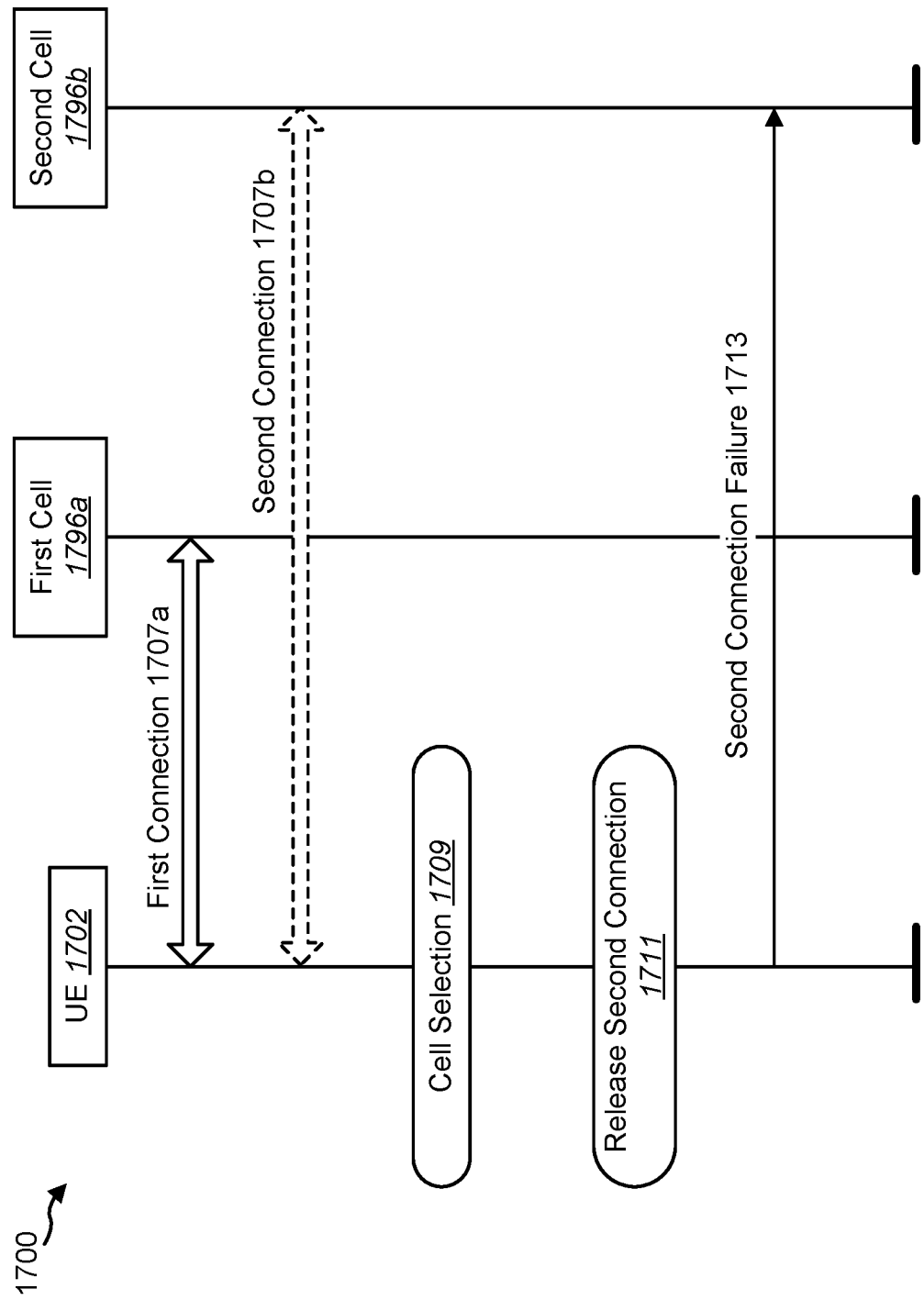
FIG. 17 is a thread diagram illustrating another configuration for re-establishing a connection.

FIG. 17 is a thread diagram illustrating another configuration 1700 for re-establishing a connection. The UE 1702, first cell 1796*a*, second cell 1796*b*, first connection 1707*a* and second connection 1707*b* may be examples of corresponding elements described in connection with FIG. 1. The first cell 1796*a* may be provided by an eNB. The second cell 1796*b* may be provided by the same, or a different eNB. As described above, in some cases, the second connection 1707*b* may experience a connection failure. In this example, the UE 1702 may attempt to select 1709 a suitable cell from cells listed in a prepared re-establishment candidate cells list and may attempt to re-establish the second connection 1707*b* with the second cell 1796*b*. If a suitable cell cannot be selected 1709, the UE 1702 may release 1711 the second connection. Accordingly, the UE 1702 may send 1713 a second connection failure message to the second cell 1796*b* indicating to the second cell 1796*b* (i.e., to an eNB) that the second connection has failed and been released.

Figure 18:
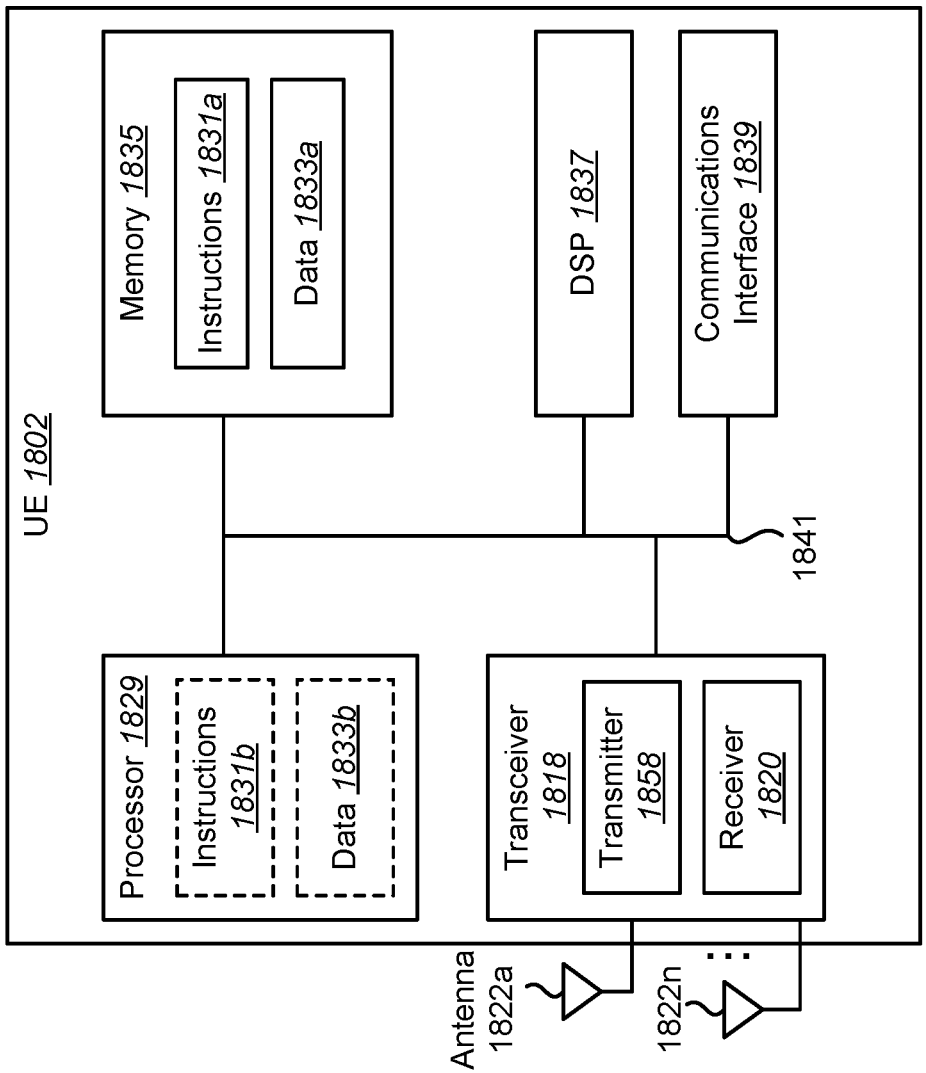
FIG. 18 illustrates various components that may be utilized in a UE.

FIG. 18 illustrates various components that may be utilized in a UE 1802. The UE 1802 described in connection with FIG. 18 may be implemented in accordance with the UE 102 described in connection with FIG. 1. The UE 1802 includes a processor 1829 that controls operation of the UE 1802. The processor 1829 may also be referred to as a central processing unit (CPU). Memory 1835, which may include read-only memory (ROM), random access memory (RAM), a combination of the two or any type of device that may store information, provides instructions 1831*a* and data 1833*a* to the processor 1829. A portion of the memory 1835 may also include non-volatile random access memory (NVRAM). Instructions 1831*b* and data 1833*b* may also reside in the processor 1829. Instructions 1831*b* and/or data 1833*b* loaded into the processor 1829 may also include instructions 1831*a* and/or data 1833*a* from memory 1835 that were loaded for execution or processing by the processor 1829. The instructions 1831*b* may be executed by the processor 1829 to implement one or more of the methods and procedures 500 and 1400 described above.

The UE 1802 may also include a housing that contains one or more transmitters 1858 and one or more receivers 1820 to allow transmission and reception of data. The transmitter(s) 1858 and receiver(s) 1820 may be combined into one or more transceivers 1818. One or more antennas 1822*a-n* are attached to the housing and electrically coupled to the transceiver 1818.

The various components of the UE 1802 are coupled together by a bus system 1841, which may include a power bus, a control signal bus and a status signal bus, in addition to a data bus. However, for the sake of clarity, the various buses are illustrated in FIG. 18 as the bus system 1841. The UE 1802 may also include a digital signal processor (DSP) 1837 for use in processing signals. The UE 1802 may also include a communications interface 1839 that provides user access to the functions of the UE 1802. The UE 1802 illustrated in FIG. 18 is a functional block diagram rather than a listing of specific components.

Figure 19:
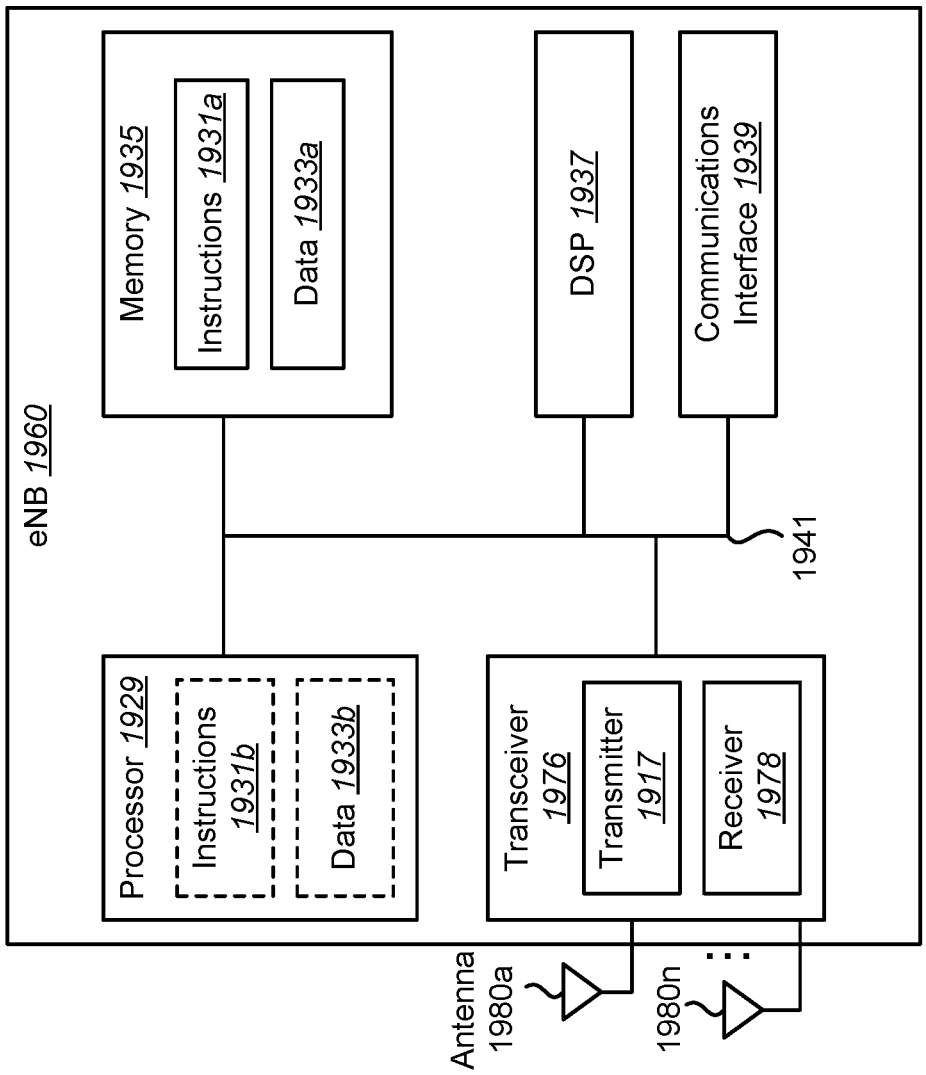
FIG. 19 illustrates various components that may be utilized in an eNB.

FIG. 19 illustrates various components that may be utilized in an eNB 1960. The eNB 1960 described in connection with FIG. 19 may be implemented in accordance with the eNB 160 described in connection with FIG. 1. The eNB 1960 includes a processor 1929 that controls operation of the eNB 1960. The processor 1929 may also be referred to as a central processing unit (CPU). Memory 1935, which may include read-only memory (ROM), random access memory (RAM), a combination of the two or any type of device that may store information, provides instructions 1931*a* and data 1933*a* to the processor 1929. A portion of the memory 1935 may also include non-volatile random access memory (NVRAM). Instructions 1931*b* and data 1933*b* may also reside in the processor 1929. Instructions 1931*b* and/or data 1933*b* loaded into the processor 1929 may also include instructions 1931*a* and/or data 1933*a* from memory 1935 that were loaded for execution or processing by the processor 1929. The instructions 1931*b* may be executed by the processor 1929 to implement one or more of the methods and procedures 600 and 1500 described above.

The eNB 1960 may also include a housing that contains one or more transmitters 1917 and one or more receivers 1978 to allow transmission and reception of data. The transmitter(s) 1917 and receiver(s) 1978 may be combined into one or more transceivers 1976. One or more antennas 1980*a-n* are attached to the housing and electrically coupled to the transceiver 1976.

The various components of the eNB 1960 are coupled together by a bus system 1941, which may include a power bus, a control signal bus and a status signal bus, in addition to a data bus. However, for the sake of clarity, the various buses are illustrated in FIG. 19 as the bus system 1941. The eNB 1960 may also include a digital signal processor (DSP) 1937 for use in processing signals. The eNB 1960 may also include a communications interface 1939 that provides user access to the functions of the eNB 1960. The eNB 1960 illustrated in FIG. 19 is a functional block diagram rather than a listing of specific components.

Figure 20:
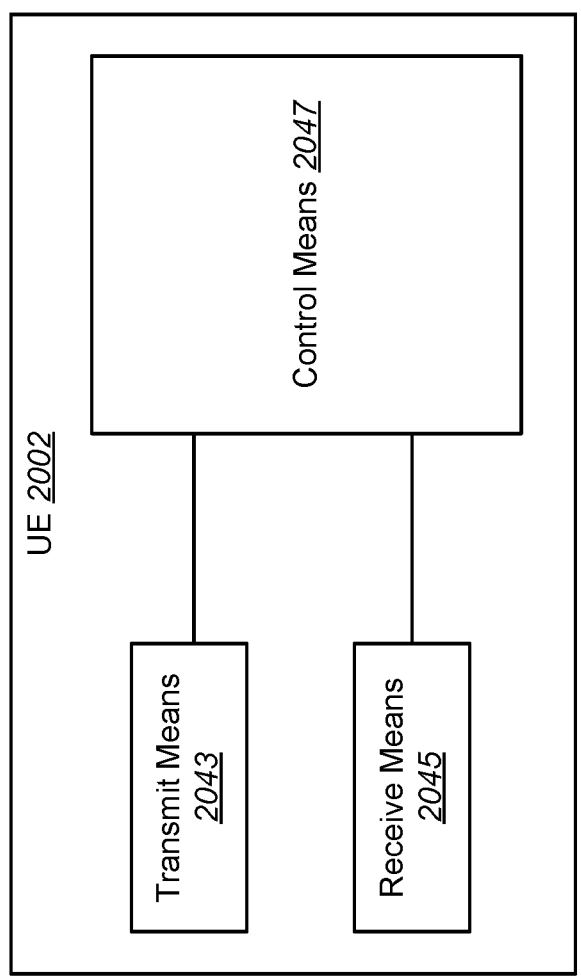
FIG. 20 is a block diagram illustrating one configuration of a UE in which systems and methods for re-establishing a connection may be implemented.

FIG. 20 is a block diagram illustrating one configuration of a UE 2002 in which systems and methods for re-establishing a connection may be implemented. The UE 2002 includes transmit means 2043, receive means 2045 and control means 2047. The transmit means 2043, receive means 2045 and control means 2047 may be configured to perform one or more of the functions described in connection with FIGS. 5 and 14 above. FIG. 18 above illustrates one example of a concrete apparatus structure of FIG. 20. Other various structures may be implemented to realize one or more of the functions of FIGS. 5 and 14. For example, a DSP may be realized by software.

FIG. 21 is a block diagram illustrating one configuration of an eNB 2160 in which systems and methods for re-establishing a connection may be implemented. The eNB 2160 includes transmit means 2143, receive means 2145 and control means 2147. The transmit means 2143, receive means 2145 and control means 2147 may be configured to perform one or more of the functions described in connection with FIGS. 6 and 15 above. FIG. 19 above illustrates one example of a concrete apparatus structure of FIG. 21. Other various structures may be implemented to realize one or more of the functions of FIGS. 6 and 15. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A user equipment (UE) for dual connectivity, comprising:
   a processor; and
   memory in electronic communication with the processor, wherein instructions stored in the memory are executable to:
   establish, by the UE, a first media access control (MAC) entity for a first set of cells of the UE and a second MAC entity for a second set of cells of the UE for dual connectivity; and
   inform, by the UE, by using the first set of cells, a wireless communication device of a failure of the second set of cells when a failure of the second set of cells is detected by the UE,
   wherein the failure of the second set of cells includes a radio link failure of the second set of cells,
   the radio link failure is detected based on a certain amount of consecutive out-of-sync indications of a certain cell from a physical layer of the UE, the failure of the second set of cells is detected by the UE, while the first set of cells and the second set of cells are configured for the dual connectivity for the UE, and the wireless communication device is informed of the failure of the second set of cells, while the first set of cells and the second set of cells are configured for the dual connectivity for the UE.

2. A method by a user equipment (UE) for dual connectivity, comprising:

establishing, by the UE, a first media access control (MAC) entity for a first set of cells of the UE and a second MAC entity for a second set of cells of the UE for dual connectivity; and informing, by the UE, by using the first set of cells, a wireless communication device of a failure of the second set of cells when a failure of the second set of cells is detected by the UE, wherein the failure of the second set of cells includes a radio link failure of the second set of cells, the radio link failure is detected based on a certain amount of consecutive out-of-sync indications of a certain cell from a physical layer of the UE, the failure of the second set of cells is detected by the UE, while the first set of cells and the second set of cells are configured for the dual connectivity for the UE, and the wireless communication device is informed of the failure of the second set of cells, while the first set of cells and the second set of cells are configured for the dual connectivity for the UE.

3. A wireless communication device for dual connectivity, comprising:

a processor; and memory in electronic communication with the processor, wherein instructions stored in the memory are executable to:

send, by the wireless communication device, information which causes a first set of cells for a first media access control (MAC) entity of a user equipment (UE) and a second set of cells for a second MAC entity of the UE to be established for dual connectivity; and receive, from the UE, by using the first set of cells, information about a failure of the second set of cells when a failure of the second set of cells is detected by the UE, wherein the failure of the second set of cells includes a radio link failure of the second set of cells, the radio link failure is detected based on a certain amount of consecutive out-of-sync indications of a certain cell from a physical layer of the UE, the failure of the second set of cells is detected by the UE, while the first set of cells and the second set of cells are configured for the dual connectivity for the UE, and the information about the failure of the second set of cells is received, while the first set of cells and the second set of cells are configured for the dual connectivity for the UE.

4. A method by a wireless communication device for dual connectivity, comprising:

sending, by the wireless communication device, information which causes a first set of cells for a first media access control (MAC) entity of a user equipment (UE) and a second set of cells for a second MAC entity of the UE to be established for dual connectivity; and receiving, from the UE, by using the first set of cells, information about a failure of the second set of cells when a failure of the second set of cells is detected by the UE, wherein the failure of the second set of cells includes a radio link failure of the second set of cells, the radio link failure is detected based on a certain amount of consecutive out-of-sync indications of a certain cell from a physical layer of the UE, the failure of the second set of cells is detected by the UE, while the first set of cells and the second set of cells are configured for the dual connectivity for the UE, and the information about the failure of the second set of cells is received, while the first set of cells and the second set of cells are configured for the dual connectivity for the UE.

* * * * *